March 10, 1942.  R. B. JOHNSON  2,275,590
EDUCATIONAL DEVICE
Filed June 21, 1938  22 Sheets-Sheet 3

March 10, 1942.       R. B. JOHNSON       2,275,590
                      EDUCATIONAL DEVICE
              Filed June 21, 1938       22 Sheets-Sheet 4

FIG. 4.

INVENTOR
Reynold B. Johnson
BY
W. M. Wilson
ATTORNEY

Figures 5, 6:
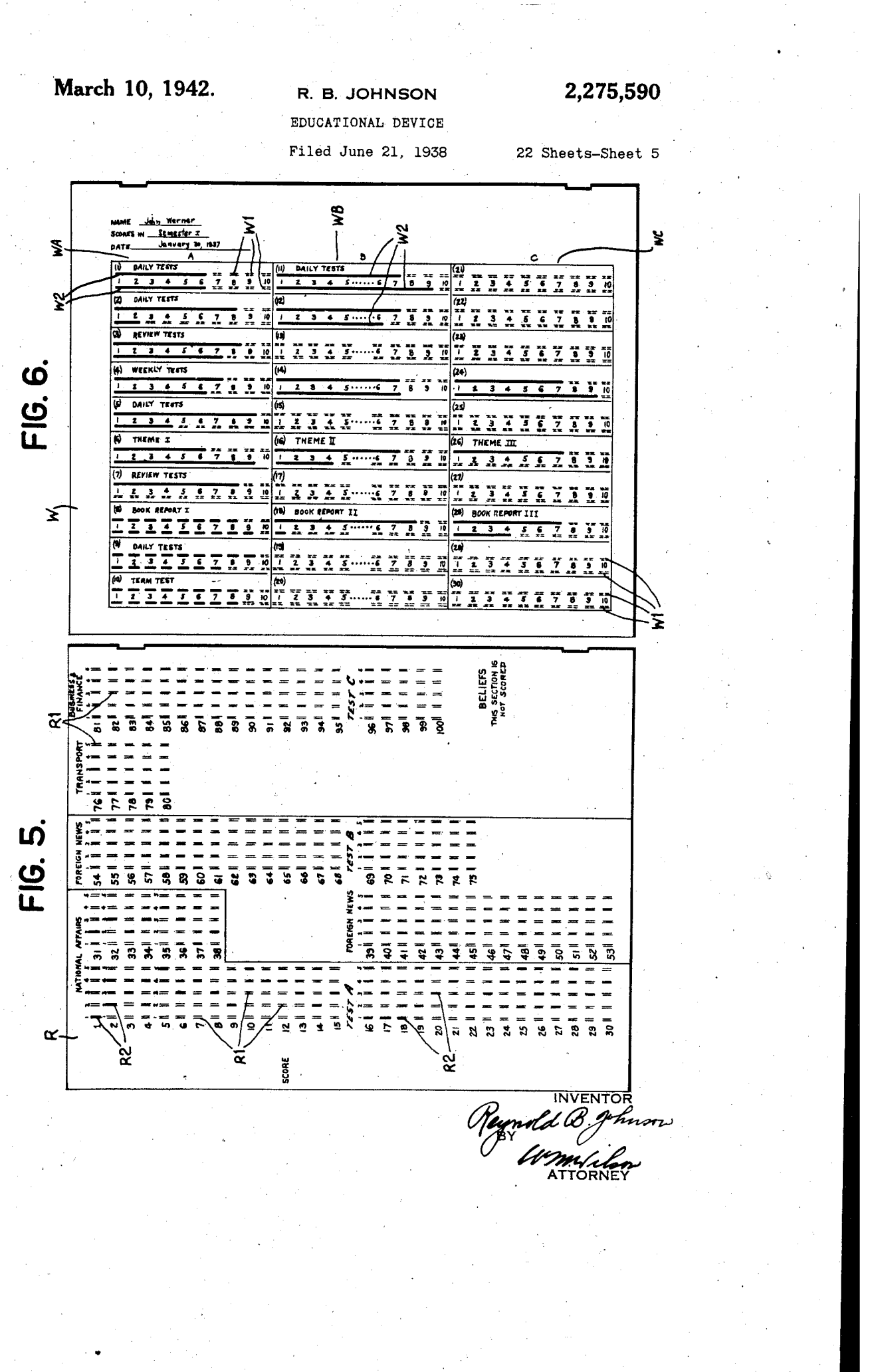

March 10, 1942.          R. B. JOHNSON                    2,275,590
                        EDUCATIONAL DEVICE
                       Filed June 21, 1938         22 Sheets-Sheet 5

INVENTOR
Reynold B. Johnson
BY
ATTORNEY

March 10, 1942.                R. B. JOHNSON                2,275,590
                              EDUCATIONAL DEVICE
                          Filed June 21, 1938           22 Sheets-Sheet 6

INVENTOR
Reynold B. Johnson
BY
ATTORNEY

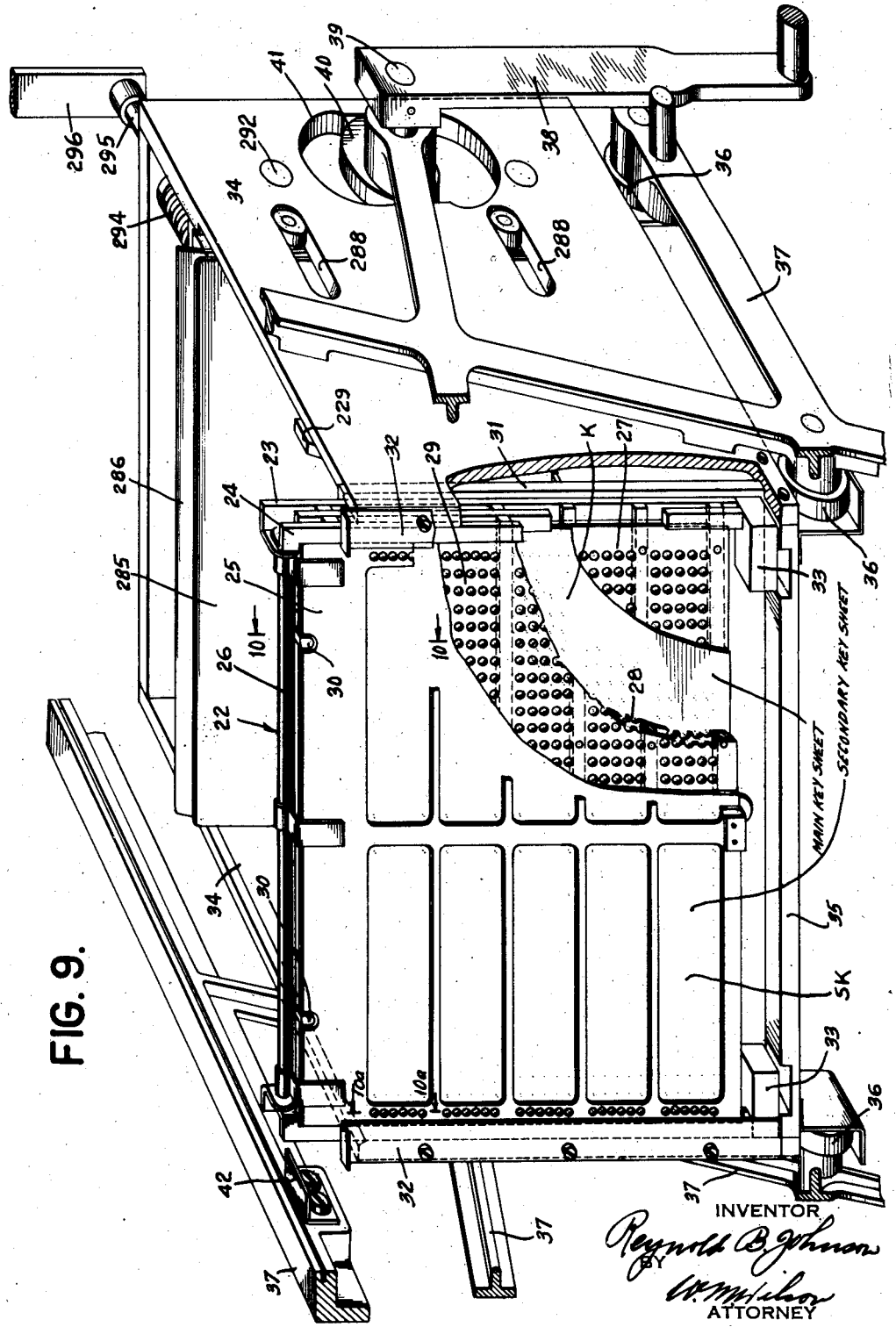

March 10, 1942. R. B. JOHNSON 2,275,590
EDUCATIONAL DEVICE
Filed June 21, 1938 22 Sheets-Sheet 8

INVENTOR
Reynold B. Johnson
BY
ATTORNEY

INVENTOR
Reynold B. Johnson
BY
ATTORNEY

March 10, 1942.    R. B. JOHNSON    2,275,590
EDUCATIONAL DEVICE
Filed June 21, 1938    22 Sheets-Sheet 10
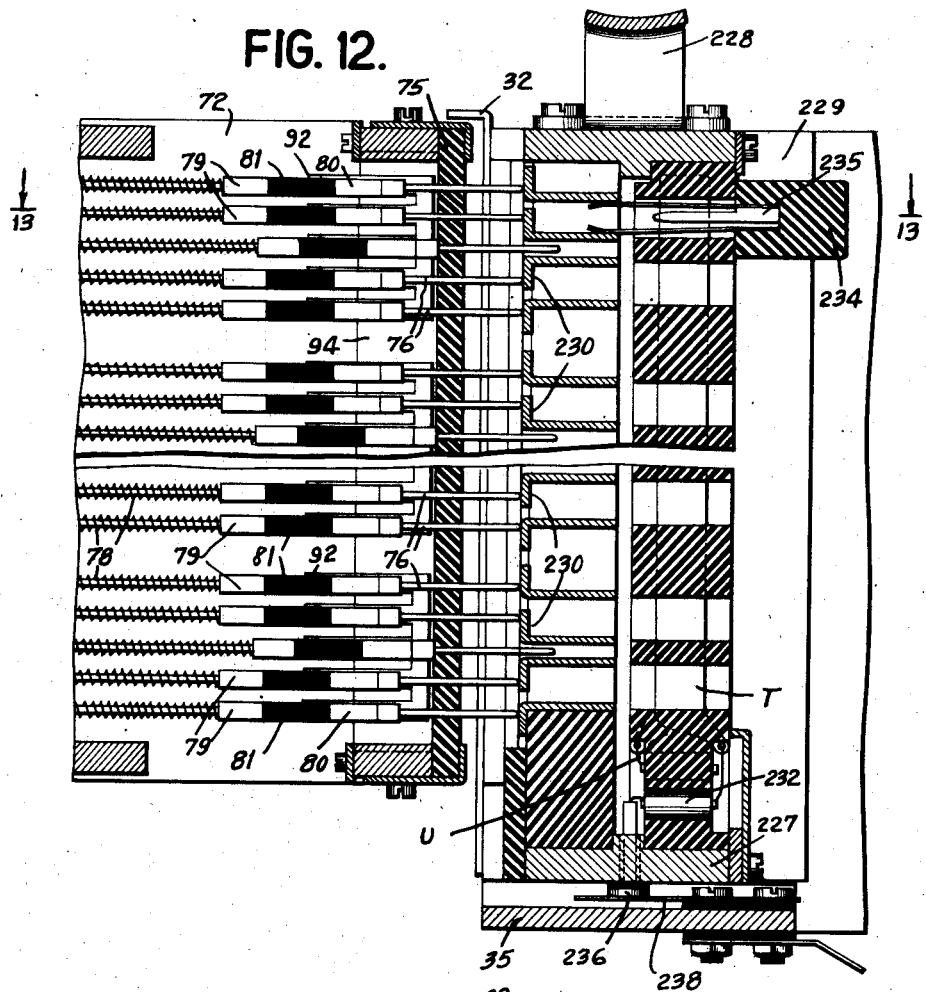
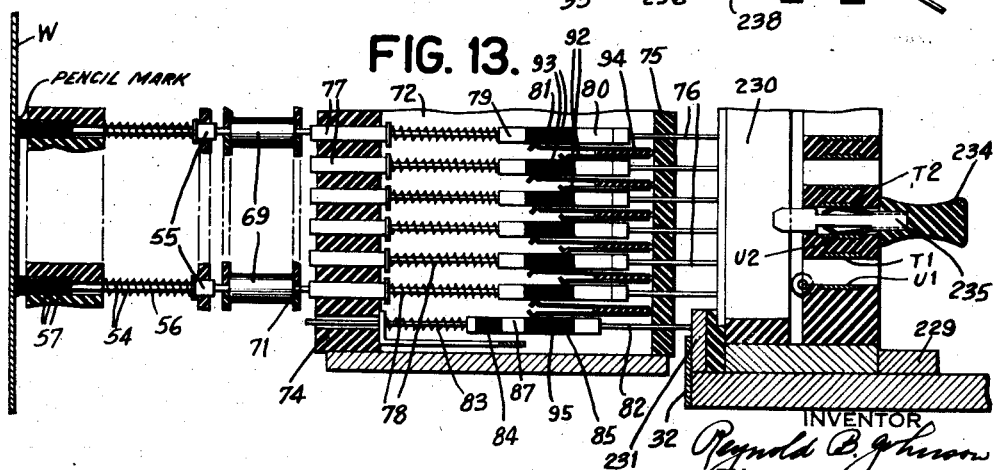

March 10, 1942.     R. B. JOHNSON     2,275,590
EDUCATIONAL DEVICE
Filed June 21, 1938     22 Sheets-Sheet 11

INVENTOR
Reynold B. Johnson
BY
W. M. Wilson
ATTORNEY

March 10, 1942.  R. B. JOHNSON  2,275,590
EDUCATIONAL DEVICE
Filed June 21, 1938   22 Sheets-Sheet 12

INVENTOR
Reynold B. Johnson
BY
ATTORNEY

March 10, 1942.    R. B. JOHNSON    2,275,590
EDUCATIONAL DEVICE
Filed June 21, 1938    22 Sheets-Sheet 13

INVENTOR
Reynold B. Johnson
BY
ATTORNEY

March 10, 1942.    R. B. JOHNSON    2,275,590
EDUCATIONAL DEVICE
Filed June 21, 1938    22 Sheets-Sheet 14

INVENTOR
Reynold B. Johnson
BY
ATTORNEY

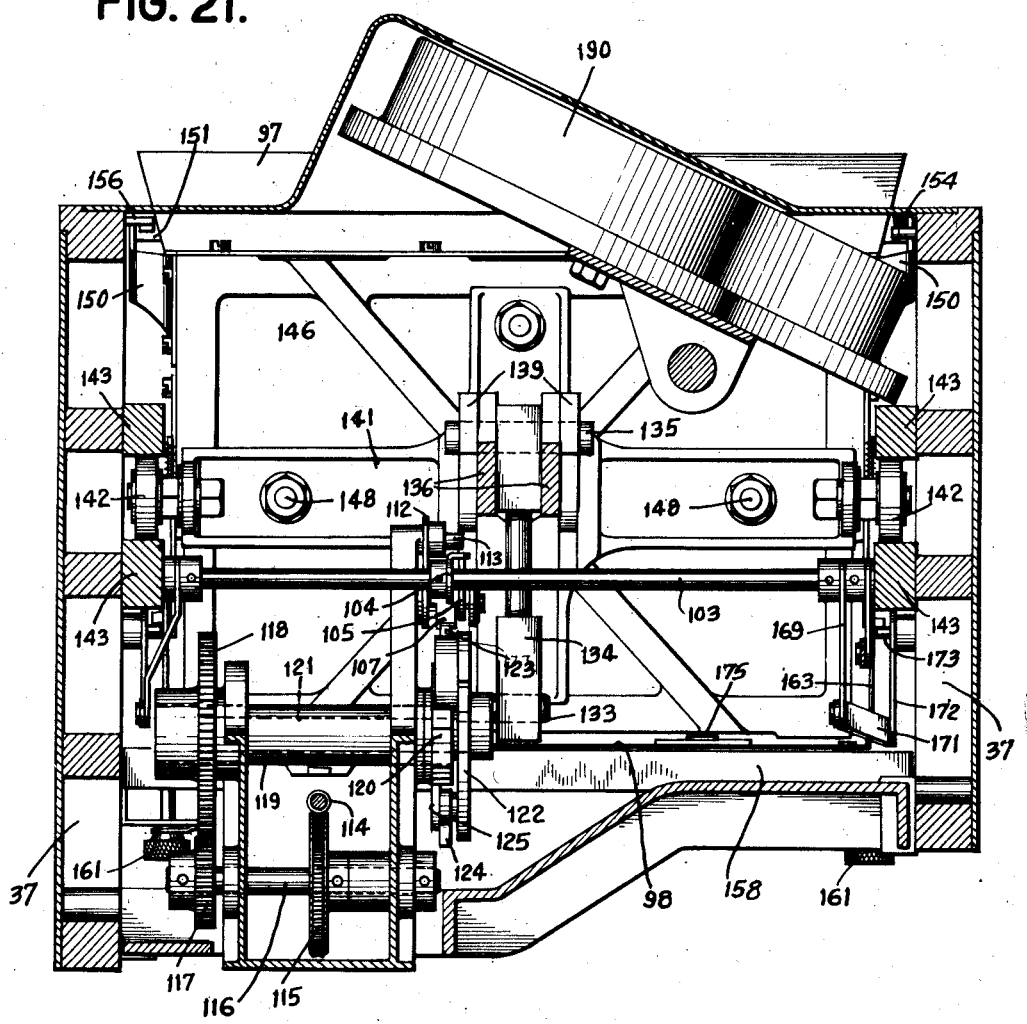

March 10, 1942.　　　R. B. JOHNSON　　　2,275,590
EDUCATIONAL DEVICE
Filed June 21, 1938　　　22 Sheets-Sheet 16

INVENTOR
Reynold B. Johnson
BY
ATTORNEY

March 10, 1942.  R. B. JOHNSON  2,275,590
EDUCATIONAL DEVICE
Filed June 21, 1938  22 Sheets-Sheet 17

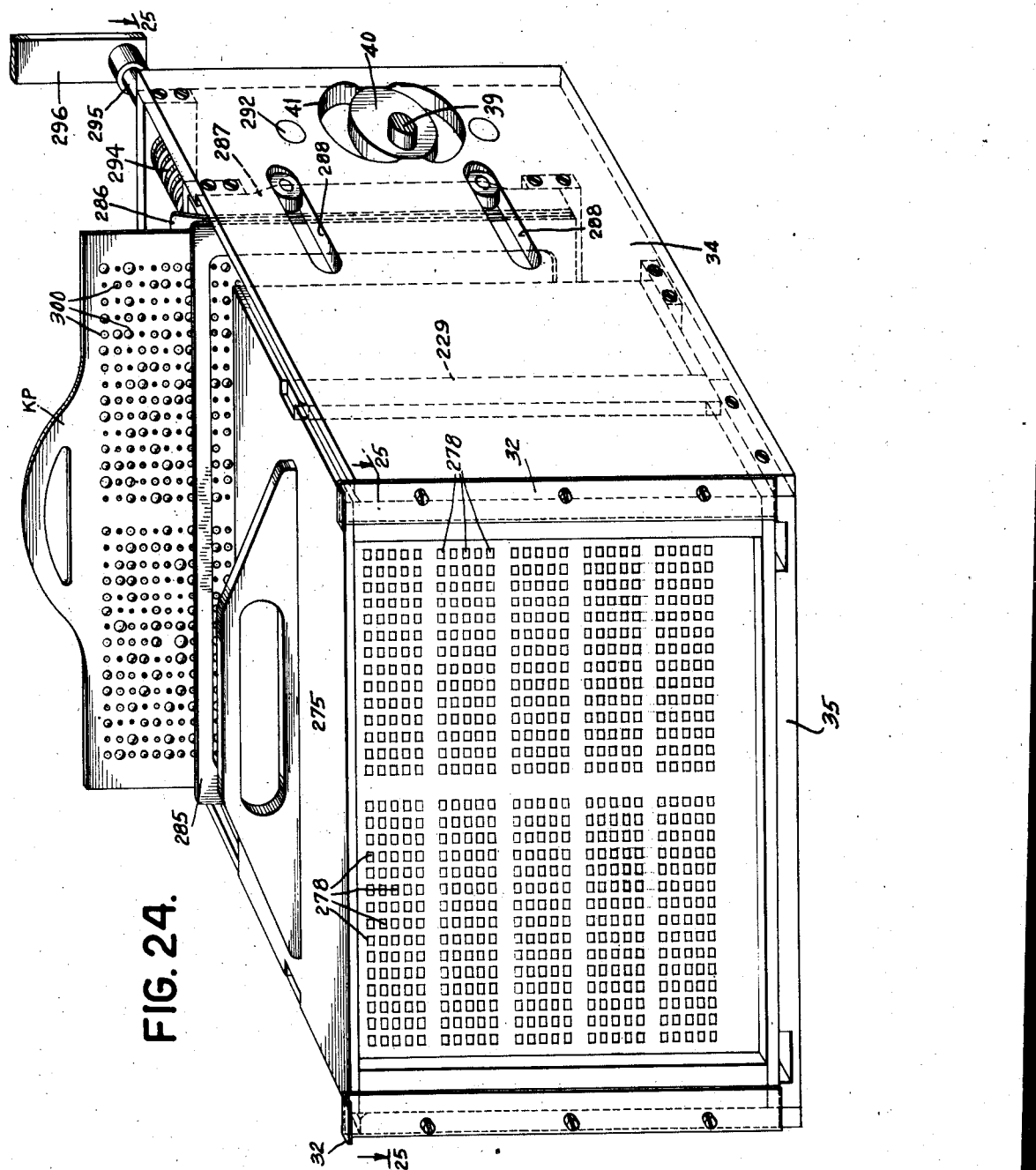

March 10, 1942.   R. B. JOHNSON   2,275,590
EDUCATIONAL DEVICE
Filed June 21, 1938   22 Sheets-Sheet 20

INVENTOR
Reynold B. Johnson
BY
ATTORNEY

March 10, 1942.   R. B. JOHNSON   2,275,590
EDUCATIONAL DEVICE
Filed June 21, 1938   22 Sheets-Sheet 21

INVENTOR
Reynold B. Johnson
ATTORNEY

Patented Mar. 10, 1942

2,275,590

UNITED STATES PATENT OFFICE 2,275,590

EDUCATIONAL DEVICE

Reynold B. Johnson, Binghamton, N. Y., assignor to International Business Machines Corporation, New York, N. Y., a corporation of New York Application June 21, 1938, Serial No. 214,922

12 Claims. (Cl. 235—61.7)

The present invention relates to a machine for electrically grading response sheets upon which an examinee has designated responses by means of pencil marks. The machine constitutes improvements over the machine shown in my Patent No. 2,113,620, granted April 12, 1938.

The main object of the invention is to extend the usefulness of a machine operating according to the principles of my former arrangement, especially in the handling of objective tests of the multiple-choice or true-false type, the responses to which may be recorded by making a record in one of several positions on a response sheet. The machine is designed to handle response sheets having a maximum capacity on each side of 150 five-choice, 300 two-choice or 750 single-choice questions. In other words, the response sheet has 750 possible marking positions to be identified or numbered to correspond to questions given orally or contained in a separate question sheet or booklet or may be printed on the answer sheet. Once the examinee decides which choice is the correct answer for a particular question, he merely makes a heavy short line on the response sheet in the number space corresponding to the number of his chosen answer.

The functioning of the machine depends on the fact that a soft lead pencil or special ink mark is electrically conductive and that the amount of current flowing through each pencil or ink mark may be controlled and kept to a uniform unit, whether the mark is very heavy or relatively light.

When the response sheet is inserted in the machine it is pressed against a contact plate containing 750 sets of sensing blades corresponding to the 750 response positions on the response sheet. These sets of sensing blades consist each of five small parallel metal blades which are connected alternately to the positive and negative sides of the circuit. Whenever a pencil mark is pressed against one of the sets of sensing blades, it closes the electric gap between the positive and negative blades and a unit of current flows through the circuit. If pencil marks are pressed against ten of the sets of contact blades, ten units of current flow through the circuit. If a pencil mark is sufficiently long, it will bridge the electric gap four times; if the pencil mark is very short, it will bridge the gap only once, but in either case the unit of current flowing through the circuit from the pencil-mark-bridge remains practically constant. This result is achieved by connecting in series with each contact unit a high resistance current limiting resistor which permits only a unit amount of current to flow into a meter circuit from each pencil mark.

The machine distinguishes between right and wrong answers by means of a perforated key sheet which automatically divides the sensing blade units into two groups, the "rights" and the "wrongs." From this division, two meter circuits result, one carrying the aggregate of the units of current from the correct responses and the other carrying the aggregate of the units of current from the incorrect responses.

The machine may be variously set, by means of various switching devices, to score in terms of the number right by routing the current from the rights circuit through a large milliammeter. This meter is ordinarily calibrated directly in terms of the unit of current flowing through the meter from each small circuit and hence the reading on the meter is equal to the number of right responses on the answer sheet being pressed against the sensing blades. The score indicated on the meter is recorded by the operator on the exposed margin of the response sheet or on a separate record sheet or the operator may call the score to a recording clerk.

If the score is in terms of the number wrong, the current from the wrongs circuit is routed through the meter which indicates to the operator the number wrong.

If the score is in terms of "rights" minus "wrongs," the "wrongs" circuit is connected to the opposite side of the meter from the "rights" circuit, so that the meter reading is the difference between the two currents, thus registering the "rights" minus the "wrongs."

The machine may be adjusted to obtain the score in terms of the rights minus one-half the wrongs, in which case one-half of the current from the wrongs ordinarily flowing through the meter is shunted past the meter and thus the score registered is the rights minus one-half the wrongs. Similarly, the score can be obtained in terms of the rights minus any fraction of the wrongs.

The machine may be adjusted so that each response may carry a value of more than 1. In doing this the applied voltage is increased, so that the current flowing through any response circuit may be greater than flows ordinarily.

If a test of 77 items, for example, is scored in terms of percentage, the voltage is stepped up so that a score of 77 is indicated on the meter as a score of 100. This is equivalent to multiplying each score by 1.298. With such setting, the response sheets are scored directly in terms of the percentage of rights, the percentage of wrongs or the percentage of rights minus the percentage of or some fraction of the wrongs. If the machine is adjusted so that the score is in terms of rights minus twice the wrongs, the voltage is doubled for all responses, but one-half of the current from the right responses ordinarily flowing through the meter is shunted past the meter. Hence, the current resulting from each right response moves the meter needle up one point and the current resulting from each wrong response moves the meter down two points.

The machine has three sets of controls which makes it possible to score with one insertion of the response sheet three different tests or three different parts of one test, and each test can be scored by any formula in terms of rights and wrongs. The machine is further provided with a "negative score" key which reverses the meter connections so that current which ordinarily causes the meter to deflect below 0 will cause it to deflect above 0. This key is utilized in such cases where the machine is set to score a number of rights minus wrongs and the number of wrongs is greater.

The machine is equipped with a special weighting unit by means of which it is possible to compute weighted averages of as many as 30 measures with weights ranging from 1 to 20. The record sheet upon which the measures to be weighted are recorded is divided into 30 areas, each containing 20 positions, 10 for the tens digit and ten for the units digit. The measures to be averaged are recorded in these areas by drawing a pencil line through the positions corresponding to the number, that is, for a grade of 75 a line would be drawn through the first 7 tens digit positions and a second line through the first five of the units digit positions. The measures are weighted by placing each of ten contacting jacks on the weighting unit in one of 20 possible weight positions. With this unit in position in the machine and the record sheet inserted and placed in contact with the sensing pins, the meter will indicate the weighted average of the measures recorded on the sheet. This unit is claimed in my copending divisional application Serial No. 364,653, filed November 7, 1940.

A further object resides in the provision of an arrangement whereby any selected portions of the response sheet may be eliminated from the scoring operations.

A still further object resides in the provision of a separate unit, insertible in the machine for enabling the separate weighting of each individual response or marking position. This unit is claimed in my copending divisional application Serial No. 364,654 filed November 7, 1940.

According to a modified form of the invention provision is made for scoring responses on an answer sheet in which each response is in the form of a perforation made in a selected position.

In the drawings:

Fig. 2a is a detail of the operating key connections.

Fig. 4 is a view similar to Fig. 3 with the parts in moved or response sheet sensing position.

Fig. 5 is a specimen of a response sheet marked in accordance with an examinee's selections.

Fig. 6 is a specimen of a record marked to represent a plurality of different measures whose average is to be obtained by the machine.

Fig. 7 is a specimen of the main key sheet perforated in positions representing the correct answers.

Fig. 8 is a similar specimen of the secondary key sheet.

Fig. 9 is an isometric view showing the key sheet holder inserted in the machine.

In Fig. 10a the section is taken substantially along 10a—10a of Fig. 9.

Fig. 12 is a section taken substantially along the lines 12—12 of Fig. 11 showing the relationship between the plugboard and the key sheet pin unit.

Fig. 13 is a plan section taken substantially along the lines 13—13 of Fig. 12.

Fig. 21 is a sectional view taken substantially along lines 21—21 of Fig. 3.

Figure 23:
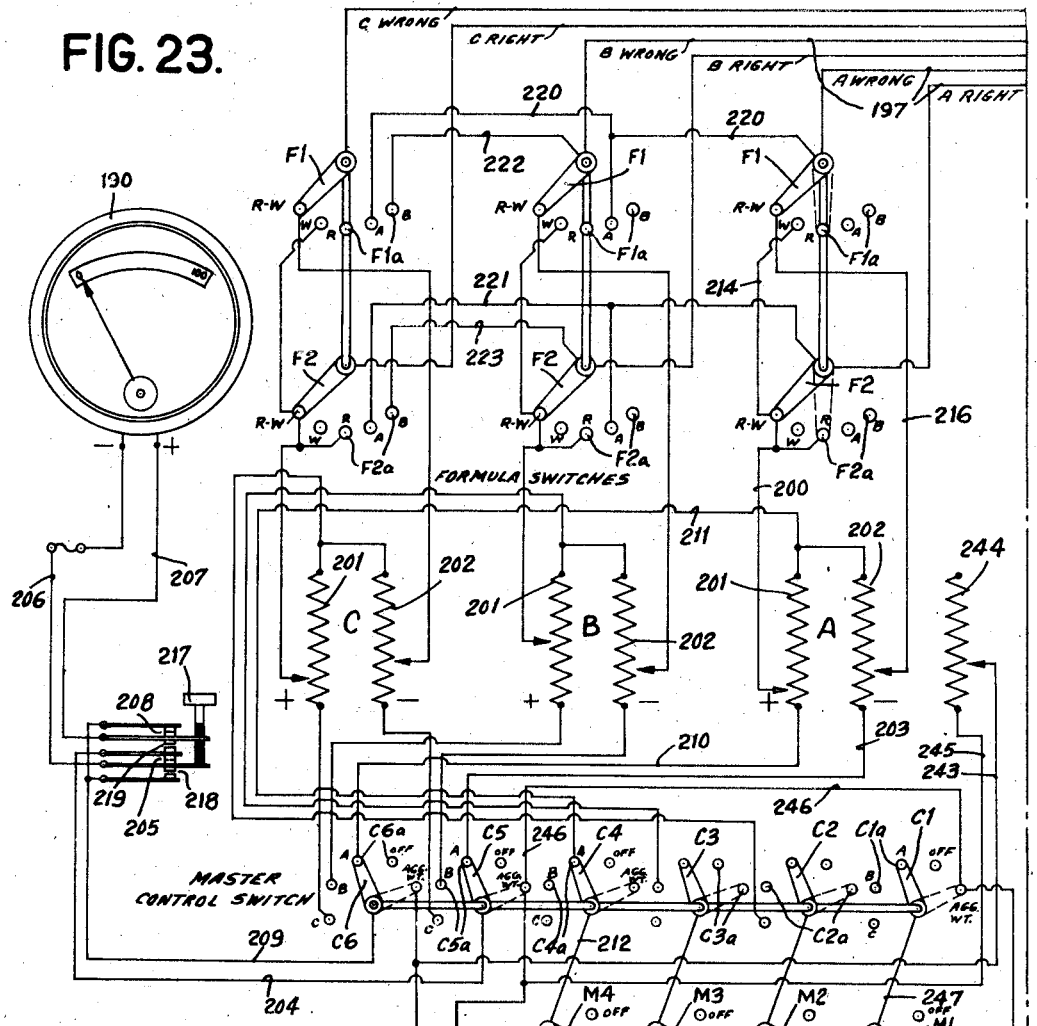
Figure 23A:
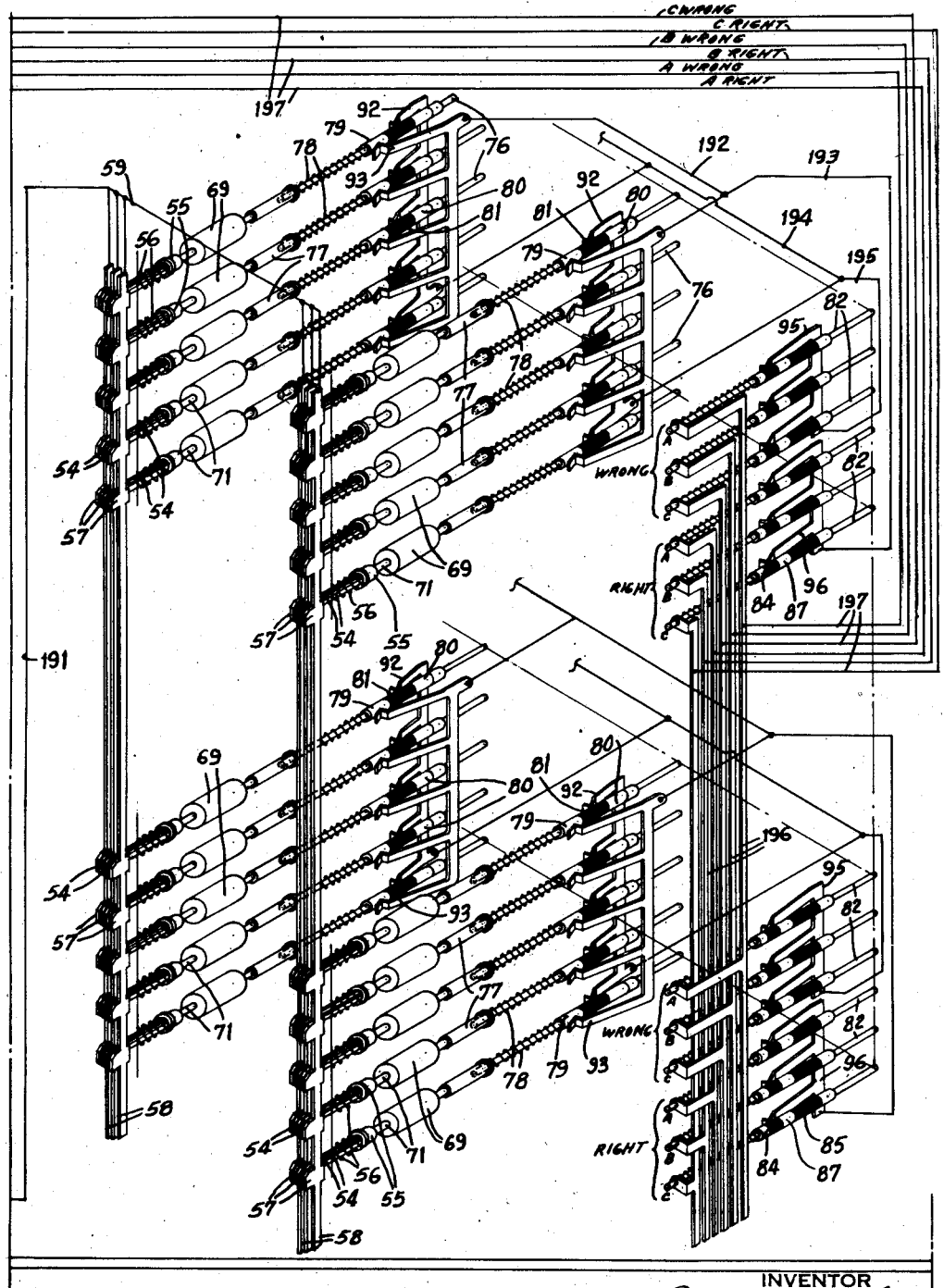
Figure 23B:
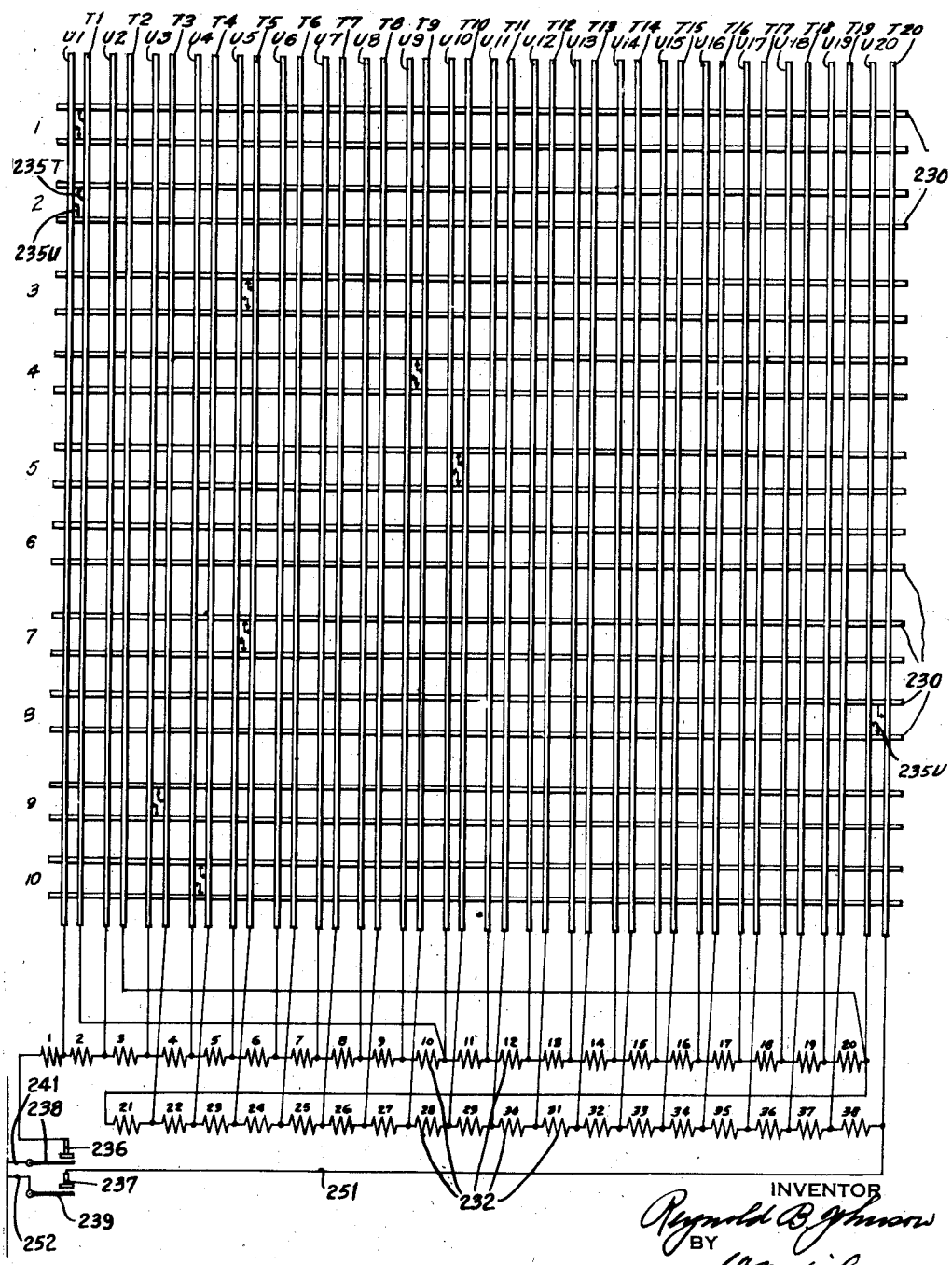

Figs. 23, 23a and 23b, placed side by side in the order named, constitute a wiring diagram of the electric circuits of the machine.

Fig. 24 is an isometric view showing the unit weighting mechanism inserted in the reciprocable carriage.

Figure 25:
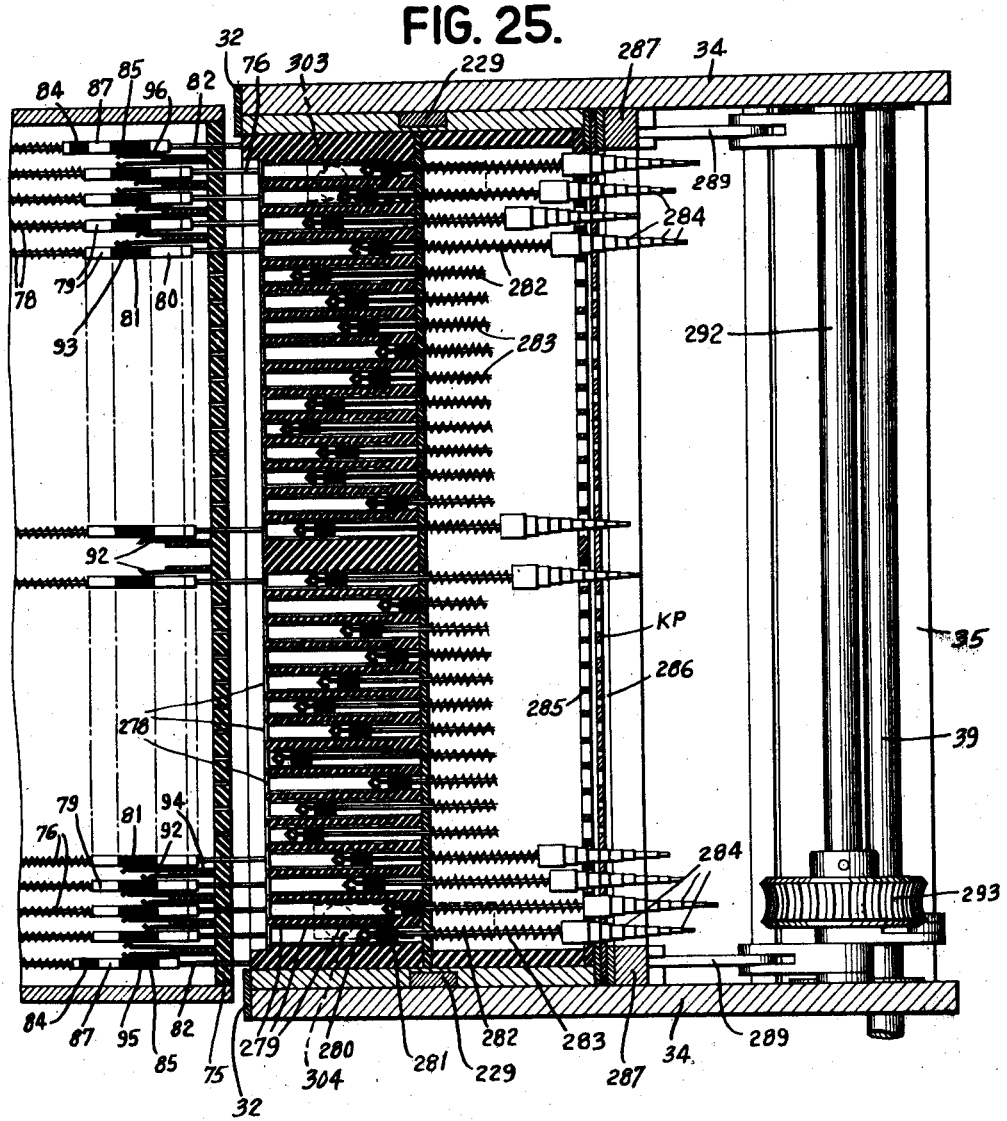

Fig. 25 is a plan section of the unit taken substantially along lines 25—25 of Fig. 24.

Figure 26:
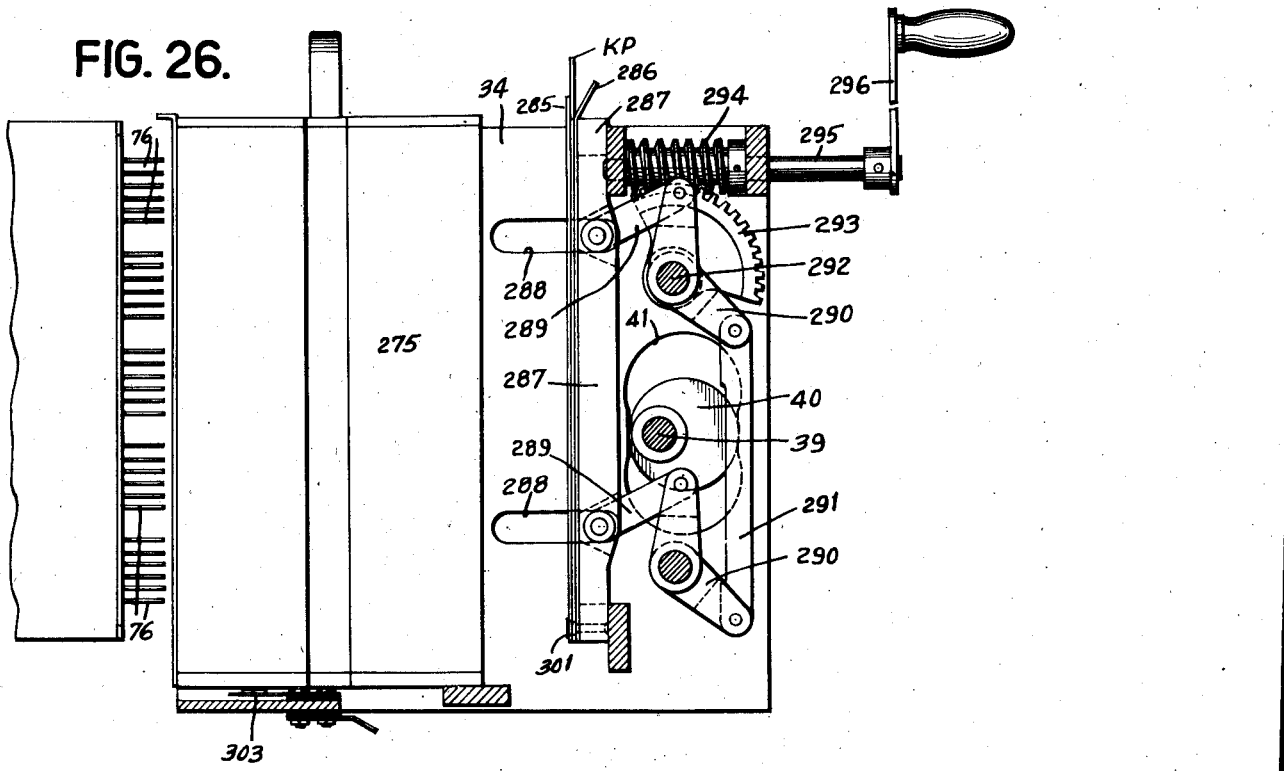

Fig. 26 is a vertical section through the same mechanism.

Figure 27:
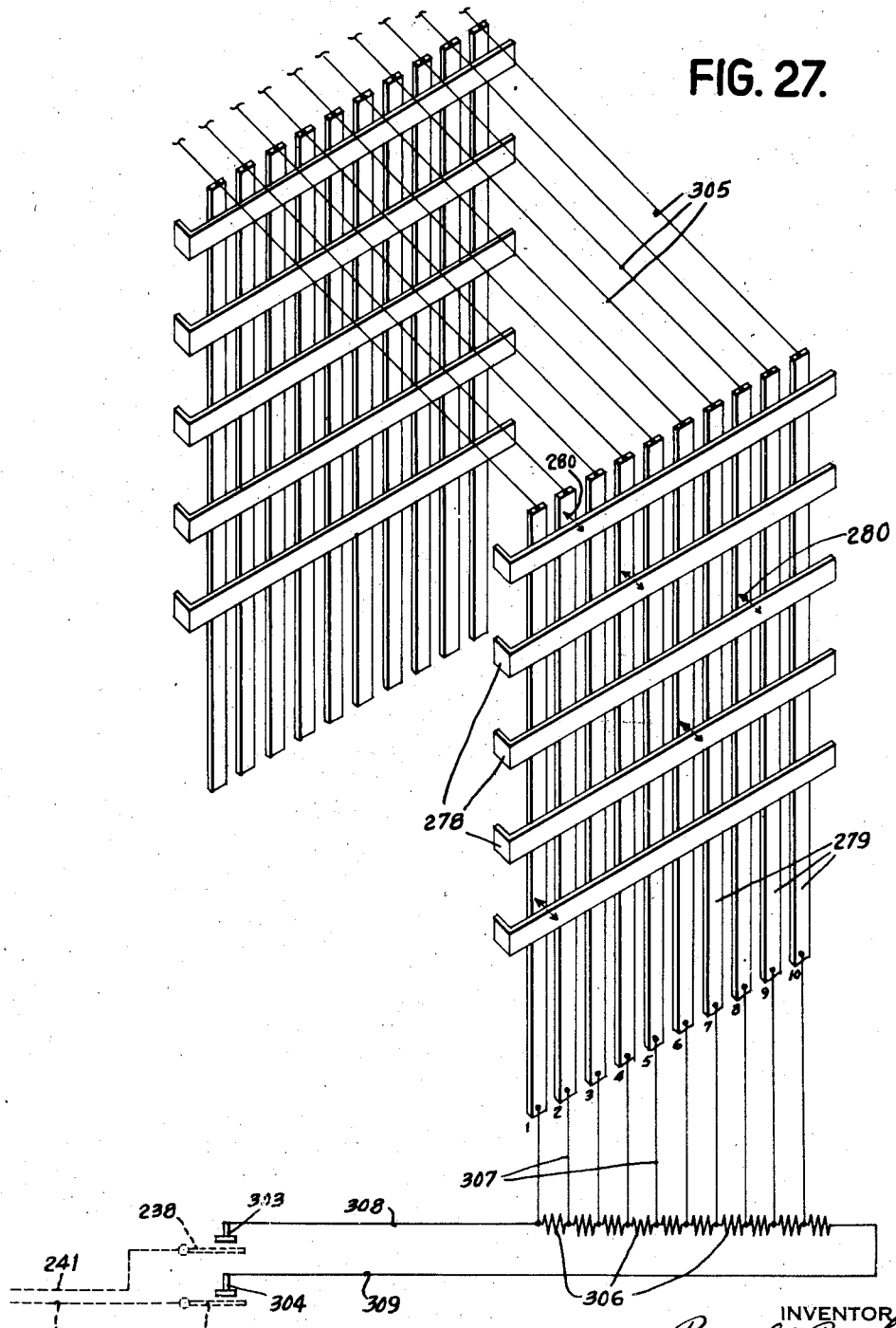

Fig. 27 is a schematic arrangement of the circuit connections in the unit. This figure taken together with Figs. 23 and 23a constitutes the wiring diagram of the machine when the unit is utilized.

Figure 28:
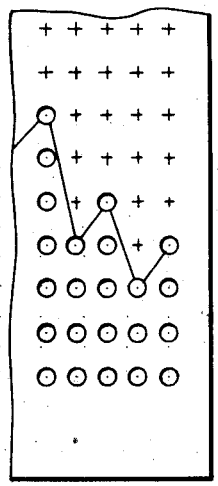

Fig. 28 is a fragment of a record having columns of perforations representing certain data.

Figure 29:
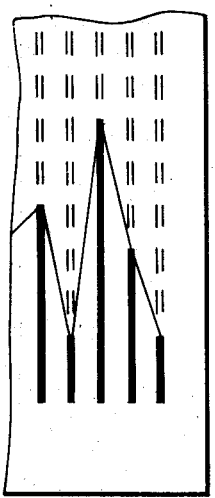
Figure 30:
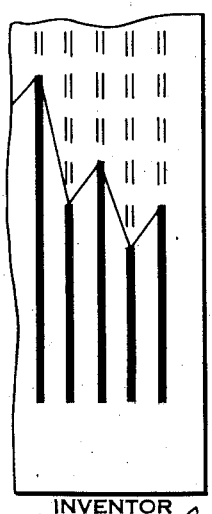

Figs. 29 and 30 are fragments of records whose data is represented by vertical pencil or ink lines, which data is to be compared with the data on the record of Fig. 28.

*Response sheet*

The response sheet R upon which the examinee records his selections is shown in Fig. 5. The sheet is provided with twenty-five vertical columns arranged in groups of five and each group of five is separated vertically into two fifteen-line fields, one or more of which may be grouped together to constitute a single test. Each response designating position R1 is delineated by a pair of vertical parallel lines between which the examinee is to draw a heavy black line R2 with a pencil or pen coextensive with the parallel lines. Thus, for example, if the first question on an examination required the selection of one of five possible answers, and if the examinee selected the first given answer as his choice, a pencil mark would be made in the 1 position opposite question 1. In the example shown in Fig. 5, the first thirty-eight response positions constitute one test designated Test A. The response positions 39 to 75 constitute a second test designated Test B, and the response positions 76 to 100 constitute a third, designated Test C.

In operating the machine, all the responses may be scored as a single test or each of the three tests may be scored separately or any two of them may be taken together to obtain their combined score. The arrangement shown in Fig. 5 provides for thirty responses in each of the five columns or 150 positions in all and as many or as few of these positions may be utilized in accordance with the requirements of the test or tests given.

Main key sheet

The main key sheet K is shown in Fig. 7 and is provided with columns and rows of indicating positions K1 corresponding to the indicating positions R1 on the response sheet. Preparation of this sheet is effected by perforating the positions representing the correct answers to the questions given as at K2. In addition to the response positions corresponding to those on the response sheet, this key sheet has a row of perforation-receiving positions K3 across the top and a similar row of positions also designated K3 across the bottom. These positions are called "field selecting" positions and they control the machine to score the responses in any desired grouping. The positions are divided into groups of six, there being one group for each fifteen consecutive response positions. Each group of six positions K3 is divided into two sets, one designated "right" and the other designated "wrong." Each of the positions in the sets of three are designated A, B, and C. The designations A, B, and C represent the three parts into which any test may be divided for separate scoring. If the response sheet is to be scored as a single test, all of the responses are assigned to test A and each one of the designating positions K3 marked "A" is perforated as at K4.

For the type of test shown in Fig. 5, where the first thirty-eight questions are assigned to test A, the next thirty-seven questions to test B, and the remainder to test C, the main key sheet K is perforated in the positions K3, as shown in Fig. 7; that is, both of the positions K3 marked "A" at the head of the first set of five columns and at the bottom of the same set of five columns and also at the top of the second set of five columns are perforated. The positions K3 of the B test are perforated at the bottom of the second set of five columns and at the top and bottom of the third set of five columns, while the C positions K3 are perforated at the top and bottom of the fourth and fifth sets of five columns of response positions. The manner in which the perforations thus made in these field selecting positions control the operations of the machine will be fully explained hereinafter.

Secondary key sheet

For ordinary scoring operations, only the main key sheet is necessary. The secondary key sheet SK (Fig. 8) is employed where it is desired to have certain parts of the test or tests rendered ineffective and any responses to certain questions excluded from the scoring. This may be desirable, for example, where, after examination questions have been prepared, it may be determined that a particular question is considered unfair and it is desired to disregard any responses made to such question. In preparing the secondary key sheet SK, perforations SK2 are made therein exactly duplicating the perforations K2 in the main key sheet. In addition thereto, all the response positions SK1 relating to any question to be excluded are punched out, as, for example, for question 96 a perforation SK2 is made in each of the five response positions. In addition, such sections of the secondary key sheet, corresponding to areas in the response sheet R of Fig. 5 in which the examinee is to make any marks other than the vertical pencil lines, are completely punched out by making perforations SK2 in all positions, as in the lower right hand corner of Fig. 8. Across the top and bottom of sheet SK are made perforations SK4 in all positions as shown. These positions SK4 correspond to the K3 positions of the sheet K. As will be explained hereinafter, the mechanism which senses the response sheet R, tests the entire area of the sheet and any marks made in response designating positions other than those utilized for a particular test would be taken into account by the sensing mechanism of the machine. In order to avoid this and permit written matter to be made in sections not to be scored, the secondary test sheet SK is punched out as shown in Fig. 8 where the entire lower right hand corner is perforated. The key sheet K remains imperforate in the positions which are to be eliminated in the response sheet. That is, where a section of a response sheet is to be rendered ineffective, the sheet SK is perforated as explained and as shown in Fig. 8 (for example, in the lower right hand corner) but the corresponding positions in sheet K are not perforated. As will be explained hereinafter, the presence of a hole in sheet SK without a corresponding hole in sheet K will render any mark sensed in the same position of sheet R ineffective.

The sheets R, K and SK as shown are adapted for use with a multiple-choice type of test where each question may have as many as five answers to be selected from. The same sheets may obviously be employed in a true-false type of test in which case the examinee would be instructed to make a mark in vertical column 1 adjacent to a question number if he deemed the statement made true and to make a mark in column 2 if he deemed the statement false. Obviously, other arrangements of printed matter are possible, for example, where only true-false questions are involved, there might be only two vertical columns of marking positions R1 for each column of questions.

Aggregate weighting record sheet

Another type of record which the machine is adapted to handle is shown in Fig. 6 and designated W which is divided into three horizontal fields designated WA, WB, and WC and ten pairs of columns of marking positions W1. Any pair of columns in one of the horizontal fields may be marked to represent a percentage or numerical value, termed a measure. For example, in the uppermost horizontal field WA, the first pair of columns to the right is marked to represent 66 by drawing a pencil line W2 coextensive with the first six marking positions W1 in the right hand column of the pair representing the tens digit of the number and a second line W2 coextensive with the first six marking positions of the left hand column representing the units digit. In this manner, each of the pairs of columns of marking positions may have pencil lines drawn therethrough to represent the several percentages a student has received for his various efforts during a given period. When this sheet is placed in the machine and various adjustments have been made, as will be more fully explained hereinafter, a weighted average will be automatically obtained of all of the measures represented on the sheet W. While it is preferable to draw a single continuous line through a series of columnar positions W1 to represent a digit, this procedure is not required and, instead, separate short lines may be made as shown in the upper left hand corner of sheet W where the three measures 89, 97 and 88 are recorded. The continuous line is more conveniently drawn and as will be more apparent from the later description the area between marking positions W1 is not sensed by the sensing devices of the machine.

Key sheet holder

After the key sheets K and SK of Figs. 7 and 8 have been prepared by suitably perforating them they are placed in a holder, generally designated 22 in Fig. 9, which is removable from the machine for the purpose of receiving the key sheets. This holder comprises three hinged sections 23, 24, and 25 with a common pivot rod 26. The construction is shown also in Fig. 10 where the section 23 is shown as having secured thereto a plate 27 of insulating material and the section 24 has integral therewith plates 28 and 29 also of insulating material. The section 25 is a cover plate with cut-out sections as shown in Fig. 9. With the holder removed from the machine, the three sections are opened and the main key sheet is inserted between the plates 27 and 28 and the secondary key sheet inserted between plate 29 and the cover plate 25, with clips 30 serving as positioning stops for the sheets.

Figure 1:
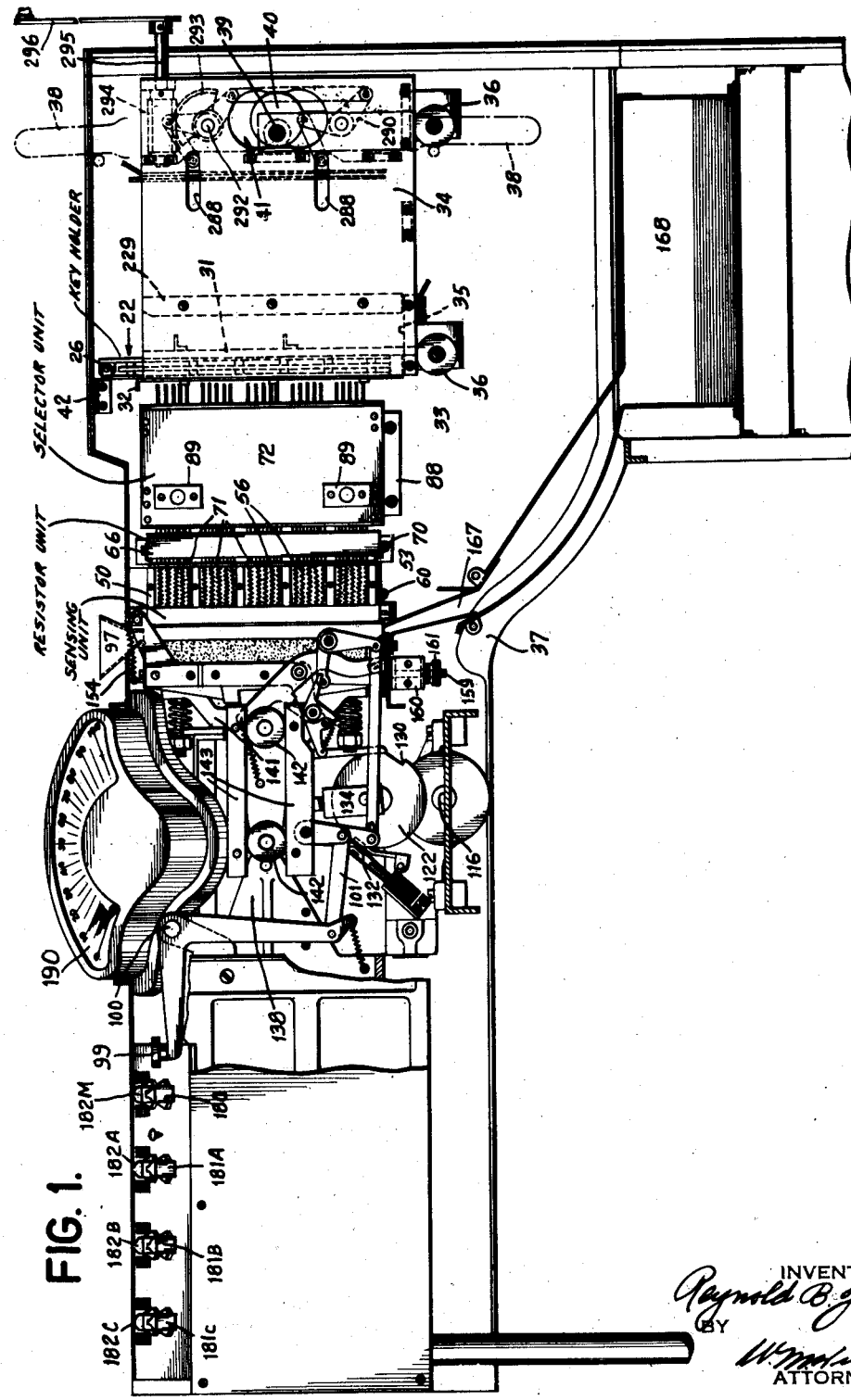
Fig. 1 is a front view of the machine with the casing partially broken away to show the interior construction.
Figure 10:
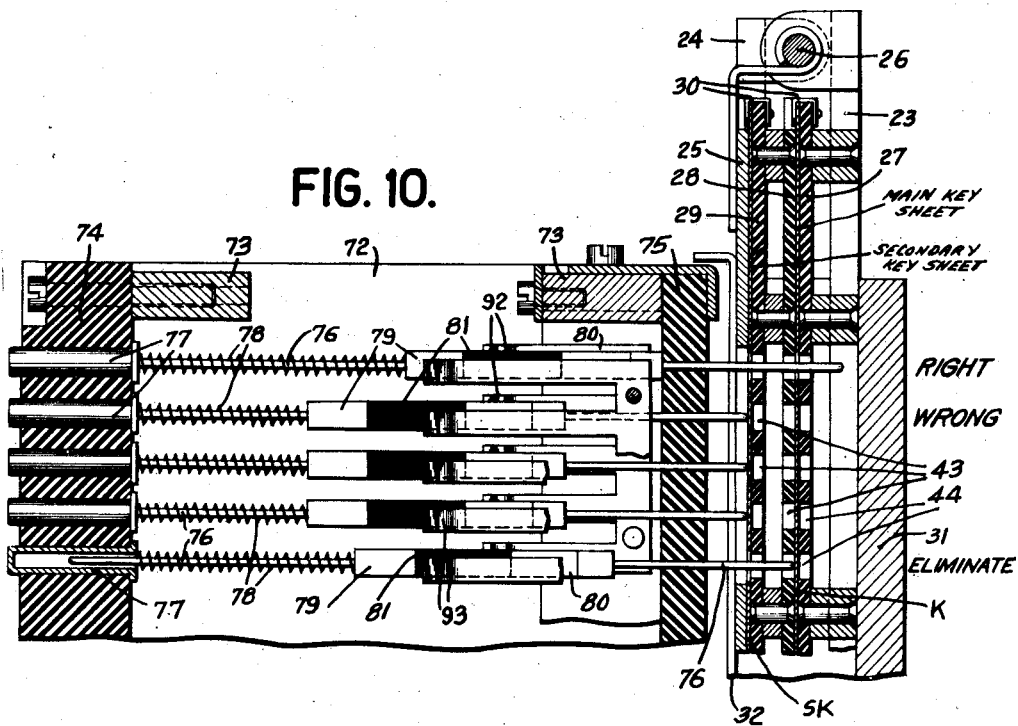
Fig. 10 is a view at an enlarged scale showing the key sheet holder and the manner in which the key sheets control the positioning of various pins. The section is taken substantially along the lines 10—10 of Fig. 9.

When two key sheets are employed, they are inserted in the holder, as indicated in Fig. 10. Where only one key sheet, that is, the main key sheet K of Fig. 7, is employed, it is placed between the plate 29 and cover plate 25 and nothing is placed between the plates 27 and 28. With the key sheets placed in the holder, the holder is slid vertically into a channel formed by a plate 31 (see also Fig. 1) and a pair of metallic strips 32. The plate 31 has a pair of blocks 33 (Fig. 9) upon which the key sheet holder rests. The plate 31 is itself insertible in a U-shaped carriage comprising a pair of side plates 34 connected together by a cross plate 35. This carriage is reciprocable upon rollers 36 which are pivotally mounted in the side frames 37 of the machine.

The key sheet holder 22 is inserted into the reciprocable carriage when the latter is in the position shown in Fig. 9. After the holder has been dropped into position, a handle 38 is rotated through substantially 180 degrees from the position shown in Fig. 9. The handle is secured to a cross rod 39 which carries a pair of cams 40 each lying within an opening 41 in a side plate 34 of the reciprocable carriage. Rotation of the shaft 39, through cams 40, will move the carriage and with it the key sheet holder toward the left as viewed in Fig. 1. This forward movement will cause the key sheets to effect the setting of the so-called key set unit which will be described hereinafter and throughout the subsequent operation of the machine the carriage and holder will remain in this advanced position. As seen in Fig. 9, when the key sheet holder and carriage move forwardly, the holder enters under an angle 42 secured to the side frame 37 which serves to prevent the removal of the holder from the carriage when the latter is in any but its rearward position.

The plates 28 and 29 of the key sheet holder are provided with perforations 43 corresponding to each possible perforating position on the key sheets. The plate 27 has perforations 44 in all the response or answer designating positions of the key sheets, but has no perforations in line with the field selecting perforating positions.

In actual use, the key sheet holder provides a convenient template for perforating the key sheets; that is, with the holder opened, one of the answer sheets may be placed upon the panel 28 and the correct answer positions punched out by means of a pencil or other pointed instrument. If the paper used for recording the examinee's responses is sufficiently tough to resist the pressure of feeler pins against the same, one of the answer sheets itself may be used as a key sheet, although it is preferable to use a sheet of card stock for this purpose.

Response sheet sensing unit

This unit is shown in Figs. 1, 3, 4, 15, and 16 and comprises a box-like frame 50 which is slidable vertically into grooves 51 in the side frames 37 of the machine. The frame 50 has a front wall 52 made up of a plurality of vertical strips of insulating material and a back wall 53 provided with a series of circular holes. For each of the 750 possible marking positions of the response sheet there is a sensing unit, one of which is shown at an enlarged scale in Fig. 17. Each unit comprises a pair of blades 54 extending from the front wall 52 into a cap 55 and about which there is a spring 56. The cap 55 is free to move axially in the wall 53. Between the two blades 54 and also on the outside of each is a blade 57, which set of three blades is insulated from the set of two blades 54. The blades 57 are electrically connected to one another and connected to one side of the circuit while the blades 54 are also electrically connected through the spring 56 and connected to the other side of the circuit. When a response sheet upon which a pencil mark is made is tightly pressed against the ends of the blades, the graphite will make an electrical connection between one or more of the blades 57 and one or both of the blades 54, depending on the length of the pencil mark. If the mark is the full length of the marking position, all the blades will be electrically connected; while a shorter mark will also effect a connection as long as it is at least long enough to bridge two of the blades.

All of the blades 57 are electrically connected to one another. This is done by constructing each vertical row of blades in the form of a vertical strip 58 (see Figs. 3 and 4) with extending pins 57 and then soldering the lower extremities of each of the strips 58 to a common wire 59. The frame 50, after it is inserted into the grooves 51, is lowered until it rests upon pins 60 carried by the side frames 37 and when in this position screws 61 are inserted to lock the sensing blade frame in position.

Figure 16:
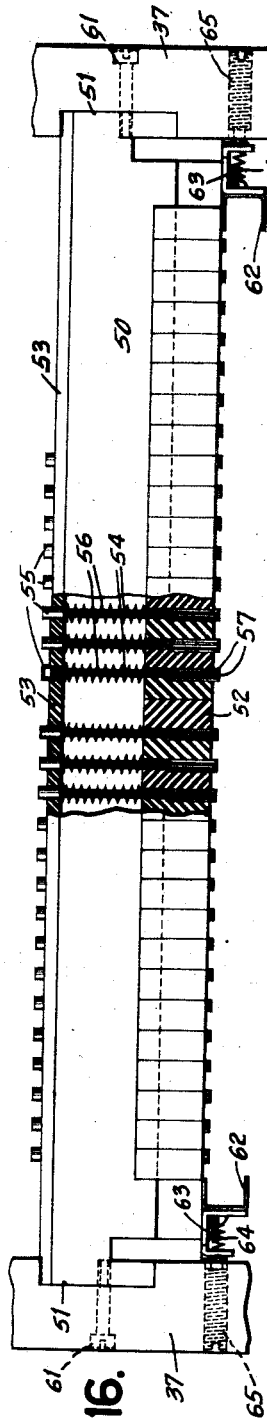
Fig. 16 is a plan view of the unit broken away to show the interior construction.
Figure 15:
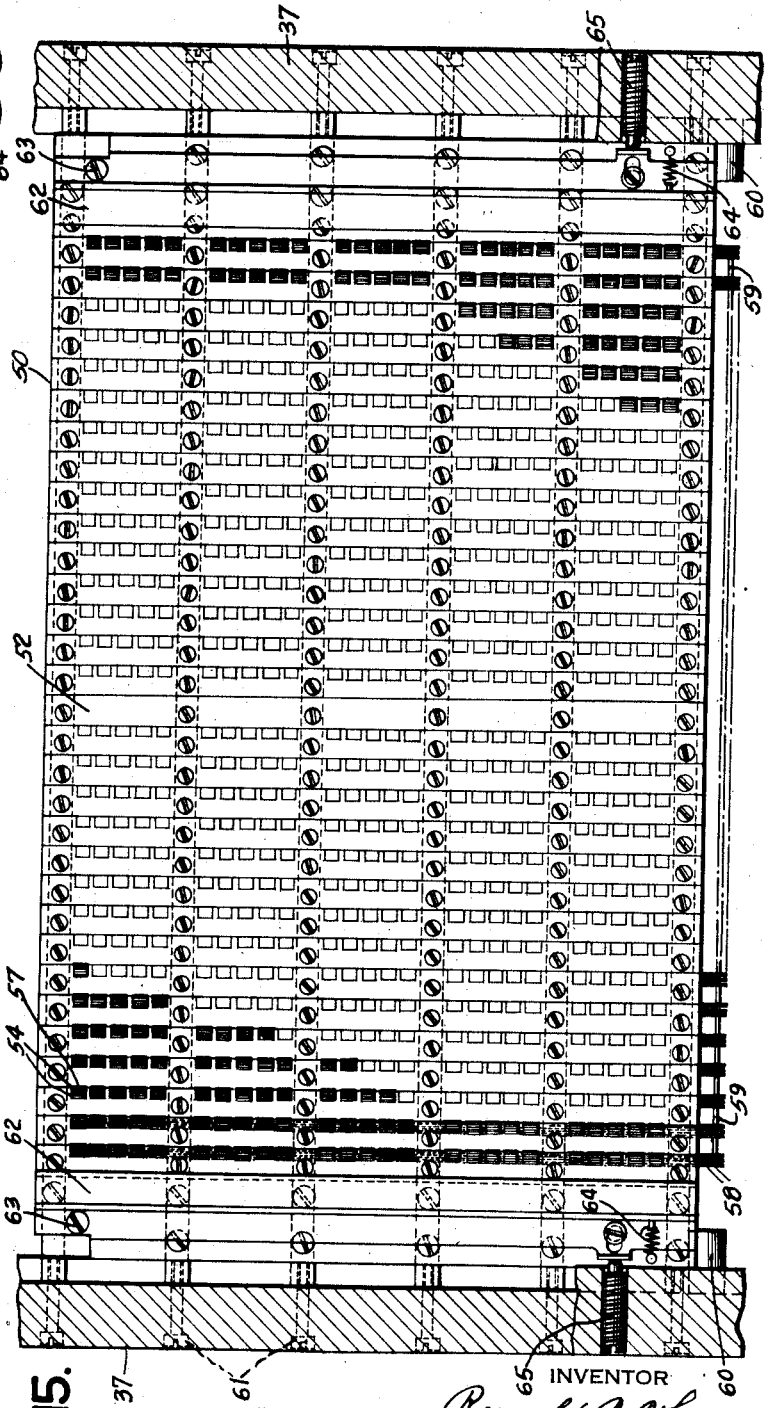
Fig. 15 is a detail view of the response sheet sensing unit.
Figure 17A:
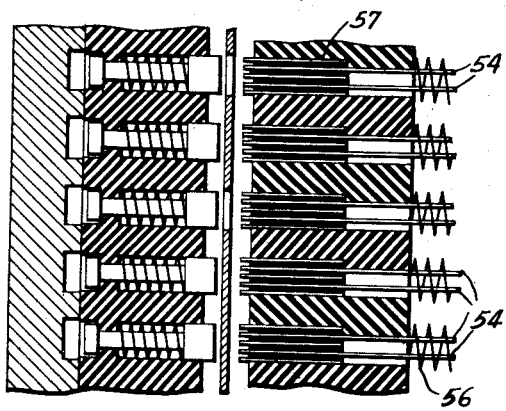
Fig. 17a is a detail showing a modified arrangement enabling the sensing blades to read marks made in the form of perforations.
Figure 17:
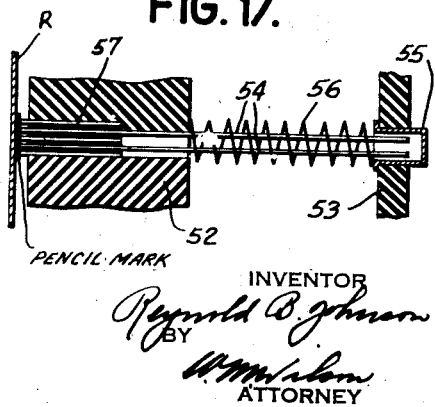
Fig. 17 is an enlarged detail of one of the sensing devices shown in Fig. 16.

Attached to the forward end of the frame at either side are channels 62 (Figs. 15 and 16)

which guide the response sheet R into position adjacent the ends of the sensing blades. Each channel is pivoted at 63 and is urged outwardly at its lower extremity by a spring 64. A set screw 65 in the side frame 37 serves to adjustably vary the position of the lower end of the channel to effect registration of the marking positions on the response sheet with the sensing blades 54, 57.

Resistor unit

Figure 3:
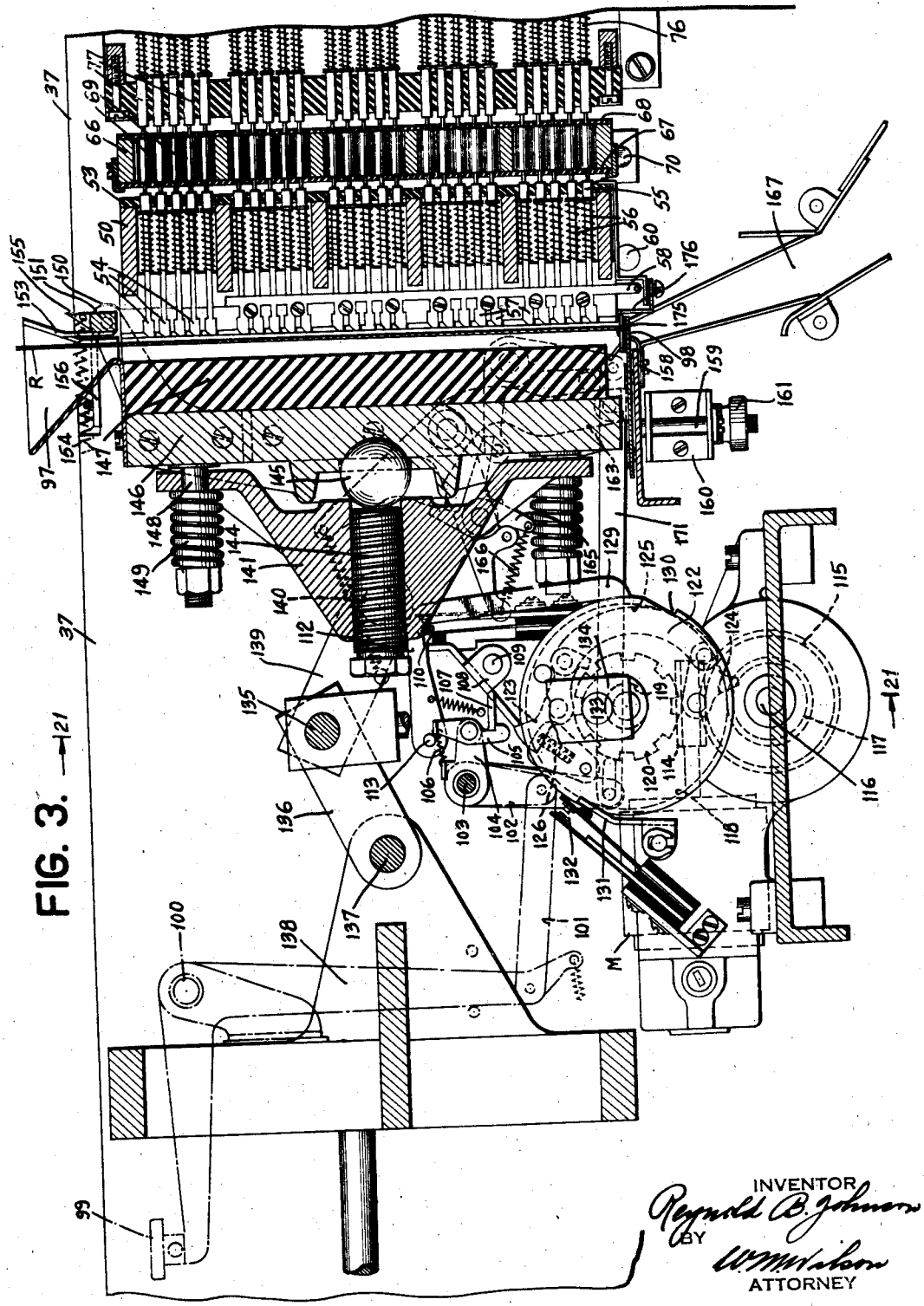
Fig. 3 is an enlarged section taken substantially along lines 3—3 of Fig. 2.
Figure 19:
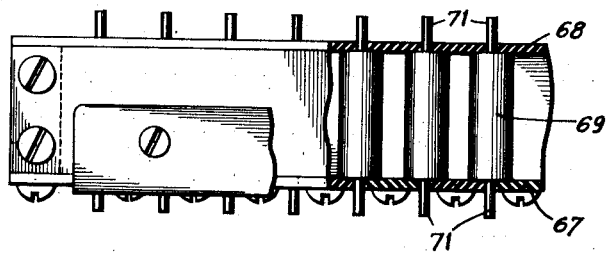
Fig. 19 is an enlarged detail of Fig. 18 taken substantially along the lines 19—19 of Fig. 18.
Figure 18:
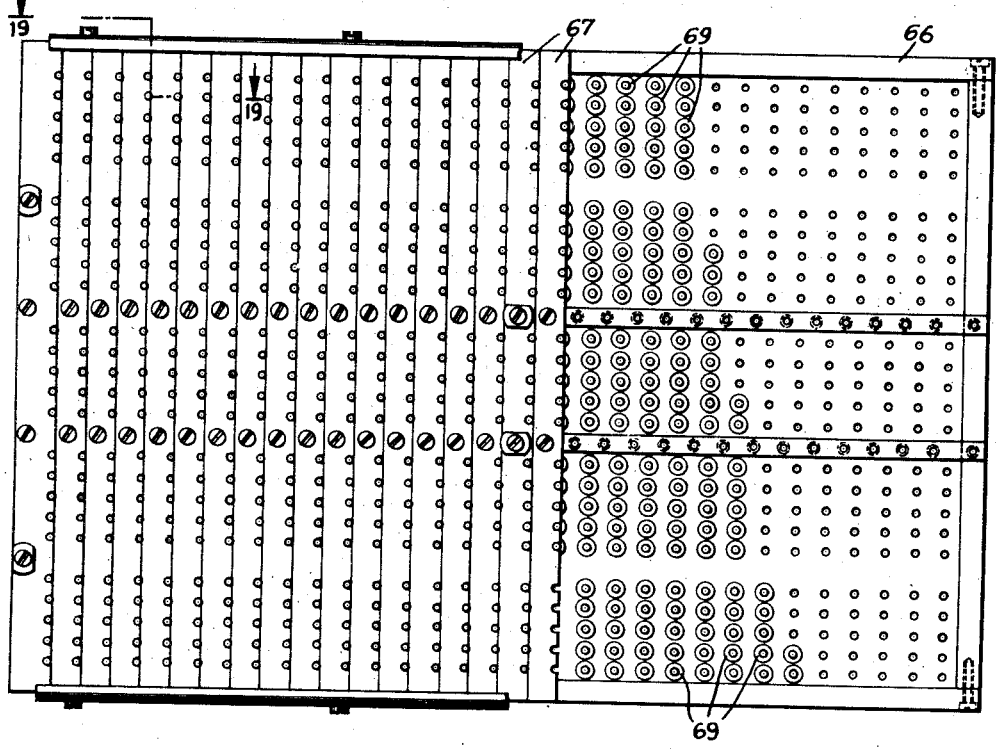
Fig. 18 is a detail of the resistor panel.

The machine is provided with a resistor unit shown in Figs. 18 and 19 which comprises a frame 66 having front and back walls 67 and 68 between which are mounted resistor units 69, one for each possible marking position on the response sheet. As seen in Fig. 3, the resistor unit is lowered vertically into the machine between the side frames 37 and rests upon pins 70 so that the rods 71 extending from the resistors 69 abut against the caps 55 of the sensing blade unit. The resistor unit is urged toward the sensing unit so that the rods 71 engage and move the caps 55 to effect adequate electrical connection therewith.

Key set selector unit

Figure 10A:
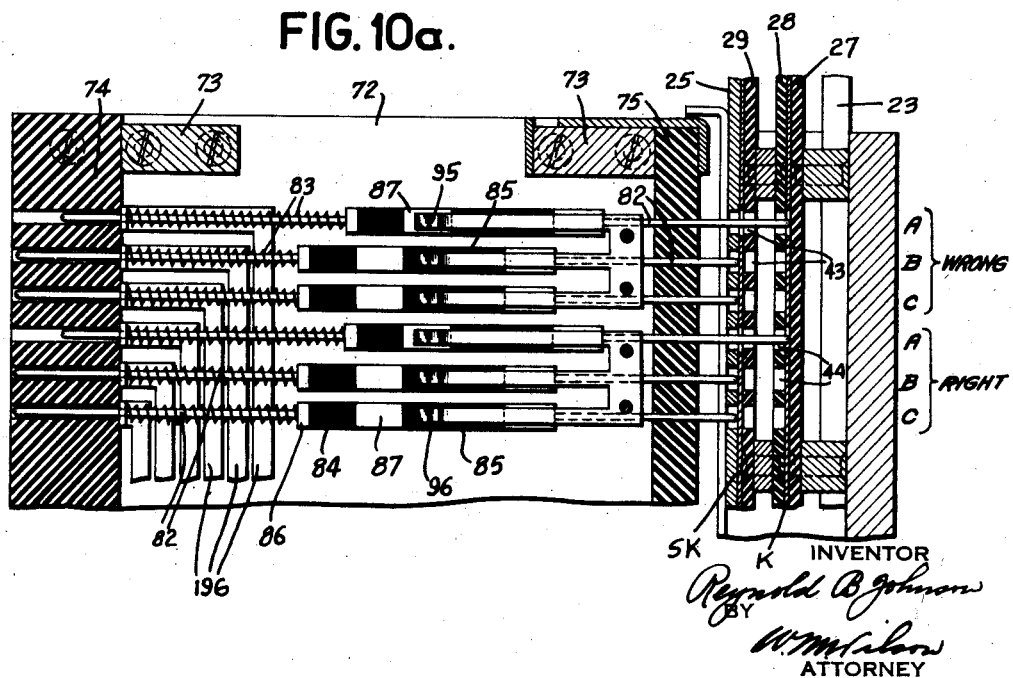
Fig. 10a is a similar view taken at another section of the holder.
Figure 20:
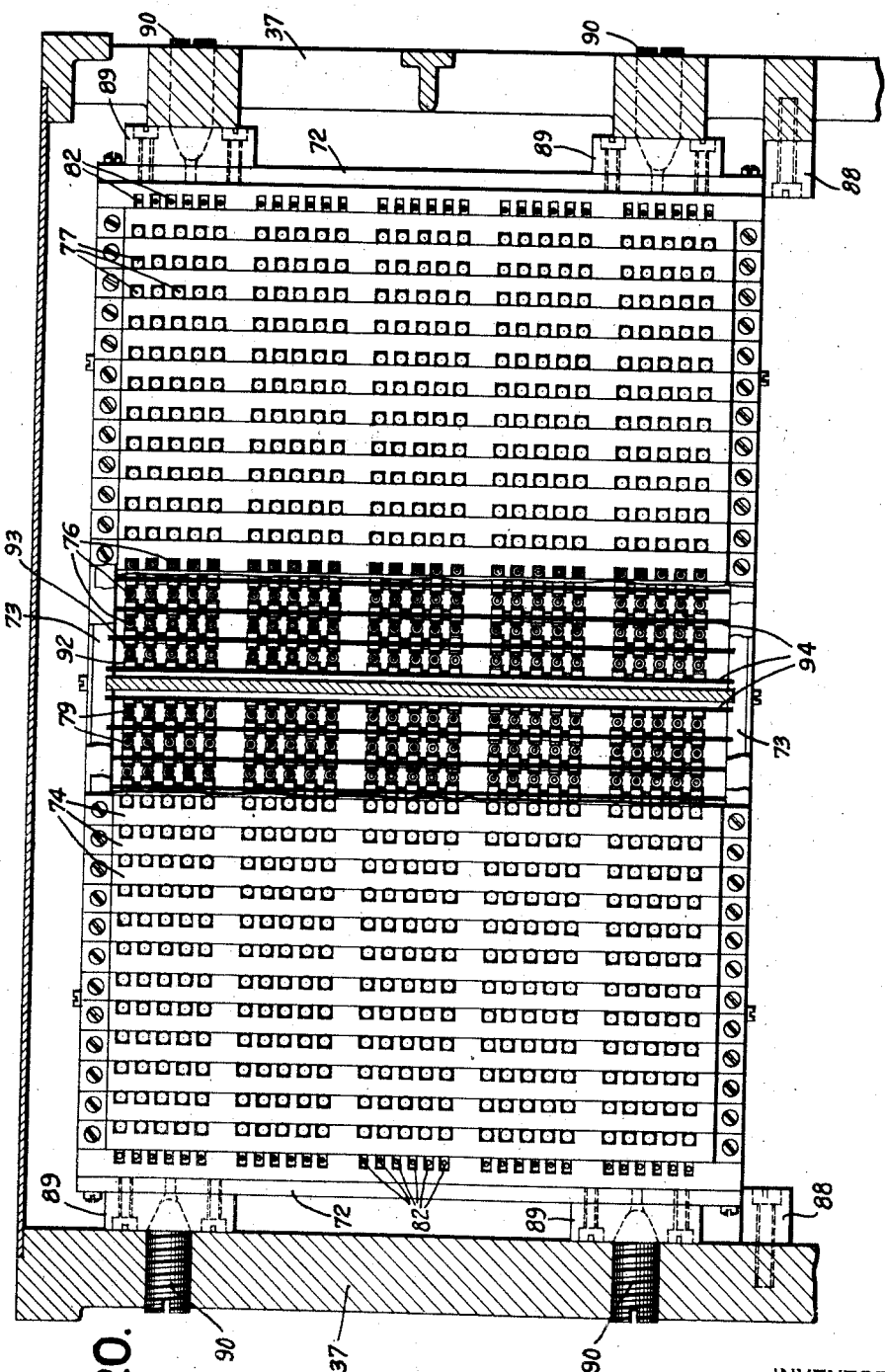
Fig. 20 is a detail view showing the key sheet pin unit and the manner in which it is supported in the machine.

This unit is shown in Fig. 20 and in section in Figs. 10 and 10a. It comprises a pair of side walls 72 and top and bottom cross members 73 which support a front wall 74 made up of individual strips of insulating material and a rear wall 75 also of insulating material. Supported between the walls 74 and 75 are a plurality of pins 76, one for each possible marking position of the response sheet. The left hand end of each pin (Fig. 10) is supported in a metallic cap 77 against which a spring 78 encircling the pin abuts. Each pin has a section of enlarged diameter intermediate its end, each section having metallic portions 79 and 80 at the extremities and an insulating portion 81 at the center.

The unit has at its left and right hand ends, as viewed in Fig. 20, sets of six pins 82 (see also Fig. 10a). These are the field selecting pins and are aligned with the positions K3 in the key sheet K in which the field identifying perforations are made. These pins 82 are also supported in the front and rear walls 74 and 75 respectively and have springs 83 normally urging them toward the right as viewed in Fig. 10a. The portions of enlarged diameter of these pins have insulated sections 84 and 85 and metallic sections 86 and 87.

Assembly of the units

The manner in which the several units are assembled in the machine will now be explained. It has already been pointed out how the sensing unit is placed in the machine and fixed in position by means of screws through the side frames 37. After this the resistor unit 66 is lowered into place on pins 70 (see Fig. 1). Following this, the key set unit is lowered into position upon supporting bars 88 (see also Fig. 20) which are carried by the side frames 37. Each of the side plates of the key set unit has a pair of blocks 89 provided with tapered holes therein into which the screws 90 are advanced. Tightening of the screws causes the key set unit to be moved toward the left as viewed in Fig. 1, so that the caps 77 press firmly against the resistor rods 71 and they in turn bear tightly against the caps 55 of the sensing pins, thus affording a good electrical contact between the related elements of the three units which maintain this relationship throughout the entire operation of the machine.

Selective setting of key set pins

The setting of the pins 76 and 82 is brought about by means of the key sheets in the holder 22. As explained before, the holder with the sheets inserted therein is placed in the reciprocable carriage 22 and moved toward the left by means of the handle 38 (Fig. 1) so that the holder assumes a position relative to the key set unit as indicated in Fig. 10. In this figure the various positions which the pins 76 may assume are shown.

Where both the main key sheet and the secondary key sheet contain perforations in the same designating position, the pin 76 is not disturbed and passes through both openings. In positions where there are no perforations in the secondary key sheet, the pin 76 is engaged and moved bodily toward the left and where there is a perforation in the secondary key sheet and none in the corresponding position of the main sheet, the pin 76 is moved toward the left part way.

Lying alongside each set of pins 76 is a blade structure 92 (see Fig. 23a). On the opposite side of the pins is a second blade structure 93. The several sets of blade structures 92 and 93 are supported on vertical strips of insulating material designated 94 (see Fig. 20), the various structures being thereby insulated from one another and from the framework of the unit. When a pin 76 is completely advanced as indicated by the uppermost pin in Fig. 10, its metallic section 79 makes electrical contact with the blade structure 93. This is the position the pin takes when the key sheets are perforated to represent a correct answer, that is, in each position in the key sheets where a right answer perforation is made, the pin 76 in alignment therewith will be in electrical connection with the blade structure 93. In positions in which the pin 76 is blocked by the first key sheet, its metallic section 80 makes contact with the blade structure 92, that is, the pins 76 in positions corresponding to wrong answers are electrically connected to the blade structure 92.

Where the pin 76 takes an intermediate position, as is represented by the lowermost pin in Fig. 10, both blade structures contact the insulating section 81 of the pin. This is the condition where two key sheets are employed and the secondary sheet is perforated to eliminate the recording of any marks in any particular position.

For ordinary scoring operations where it is not required that any sections of the response sheet should be eliminated, only the main key sheet is employed and, as explained hereinabove, this key sheet is then placed between the plate 29 and the cover 25. In such case each pin 76 will take the position in which it is electrically connected to the blade structure 93 or the position in which it is electrically connected to the blade structure 92 and there will be no intermediate position.

Referring now to Fig. 10a, the six field identifying pins have lying adjacent thereto a blade structure 95 which engages with the three uppermost pins and a blade structure 96 which engages only the three lowermost pins (see Fig. 23a). These pins, it will be recalled, sense the special perforating positions K3 of the key sheet K and are affected only by perforations in the nearer sheet; inasmuch as it has been explained, the backing plate 27 (Fig. 10a) does not have holes in line with these pins so that they take either a position where they advance through a perforation in the key sheet to make electrical contact between section 87 of the pin and blade structure 95 or they are engaged by the unperforated portion of the key sheet to present the insulating section 85 to the blade structure. The three lowermost pins take similar positions with respect to their blade structure 96. The manner in which the electrical connections thus established by the pins 76 and 82 under control of the key sheets control the scoring of the markings on the response sheet R will be more clearly set out hereinafter in connection with the description of the electrical circuits of the machine.

*Response sheet handling mechanism*

The manner in which the marked response sheet is inserted in the machine and sensed will now be explained.

Referring to Fig. 3, the response sheet R is inserted through a chute 97 through which it drops to rest upon a shutter 98. The sheet is inserted with the markings facing the sensing blades 57 and 54. An operating key 99 is now depressed. This key is pivoted at 100 and through a link 101 and an arm 102 causes a cross-rod 103 to rock counterclockwise. Secured to the rod is an arm 104 upon which is pivoted a latch 105 between which and an extension of arm 104 there is a spring 106. Latch 105 hooks under an extension 107 of a member 108 which is pivoted at 109. As a result of the depression of key 99, arm 104 is rocked counterclockwise and hook 105 rocks member 108 clockwise causing its upper extremity to close a pair of contacts 110. Closure of contacts 110 will complete a circuit through the driving motor M (see also Fig. 22 which shows the circuit connection through the motor M when the main switch 111 is closed). The member 108, upon being rocked, is engaged at its upper end by a spring pressed latch 112 which serves to hold the member in its rocked position and incidentally maintains contacts 110 closed. At the extremity of the upward stroke of latch 105, its left hand edge engages a pin 113 causing the latch to rock clockwise about its pivot and disengage the member 108.

The shaft of motor M carries a worm 114 (see also Fig. 21) which drives the worm wheel 115 on a shaft 116 to which is also secured a gear 117 meshing with a gear 118 secured to a tube 119 whose opposite extremity carries a clutch driving element 120. Supported within tube 119 is a shaft 121 on whose extremity is mounted a disk 122. The disk 122 has pivoted thereto a pair of dogs 123 and 124 connected together by an arcuate link 125 (see Fig. 3). A spring 126 normally urges the dogs in a clockwise direction to effect clutching engagement with driving element 120. This engagement is prevented when the dogs are in the position shown in Fig. 3, due to the engagement of dog 123 with the lower extremity of member 108. When the member is rocked under control of the key 99, dog 123 is released so that spring 126 may effect a clutching engagement, upon which, the disk 122 is driven through a half revolution to the position shown in Fig. 4, wherein the member 108 is returned to its normal position and where its lower extremity will engage dog 124 and cause uncoupling of the clutch connection. Member 108 is released from its latched position prior to the arrival of dog 124 in the position shown in Fig. 4. This is effected through engagement of the protruding end of dog 123 with an extension 129 of the latch 112.

By virtue of the provision of pin 113 which rocks latch 105 out of engagement with member 108, the disk 122 can only make a half revolution, regardless of whether the key 99 is held depressed or not. On the periphery of disk 122 are a pair of notches 130 in which a rebound latch 131 engages to prevent rebound of the parts upon declutching. Lying adjacent the latch 131 is a pair of contacts 132 which are connected in parallel with contacts 110 (see Fig. 22). These contacts take over control of the motor circuit from the period shortly after disk 122 commences to rotate and maintain the circuit until rotation of the disk is interrupted. Extending from disk 122 is an eccentrically mounted pin 133 upon which is supported one end of a connecting rod 134 whose opposite end carries a pin 135 (see also Fig. 21). The pin 135 carries a pair of links 136 (see Fig. 2) whose opposite ends are pivoted to a pin 137 supported in a fixed frame 138. Pin 135 also supports a second pair of links 139 whose opposite ends are pivoted to a pin 140 carried by a slidable frame 141. The frame 141 is provided with pairs of rollers 142 which are movable horizontally as viewed in Fig. 1 between guide rails 143 secured to the side frames 37 of the machine. The pairs of links 136 and 139 form a toggle which, when the eccentric pin 133 moves from the position of Fig. 3 to that of Fig. 4, brings the three pins 135, 137 and 140 into approximate alignment, causing the frame 141 to be forcibly moved toward the right as viewed in Figs. 3 and 4.

Threaded in the frame 141 is a stud 144 which through a ball 145 presses against a plate 146 to which is attached a platen 147. The plate 146 carries four studs 148 extending through the frame 141 to effect a resilient connection therewith through the medium of springs 149. The structure permits the platen 147 to be pressed tightly against the response sheet with the pressure evenly distributed over the entire area of the platen.

The sheet receiving chute 97 is attached to the plate 146 and moves therewith. Also attached to the plate 146 are bracket arms 150 between which there extends a bar 151 (see also Fig. 2) having a number of fingers 153 integral therewith. A spring 154 anchored at one end to the side frame 37 and at the other end to a camming projection 155 of the bar 151 is normally urged in a counterclockwise direction as viewed in Figs. 3 and 4 but restrained against such movement by a plate 156 attached to the side frame and lying in the plane of the camming surface 155. When the platen is moved toward the right (as shown in Fig. 3) to the position shown in Fig. 4, the bar 151 moves away from the plate 156 and spring 154 will cause the bar 151 and its fingers 153 to turn counterclockwise to engage the upper end of the response sheet and fold it over against the inclined surface of the chute 97. The upper surface of the bent over section of the response sheet is to have the score or scores recorded thereon which can conveniently be done by the operator with the sheet held as shown, the inclined surface of the chute serving as a writing surface. Upon the return movement of the platen, cam surface 155 will engage plate 156 to again return the fingers to their upright position of Fig. 3.

With the platen pressed firmly against the response sheet and the latter in turn tightly pressed against the sensing blades, the markings on the sheet will control the electric circuits to be described hereinafter to determine the score which the operator records on the upper section of the inserted sheet. Following this, the operating key 99 is depressed a second time and again the member 108 is rocked to release the clutch dog 124 for engagement with the driving element 120 and disk 122 will make a half revolution, contacts 110 closing to initially complete the circuit through the motor M and contacts 132 picking up and maintaining the circuit until the half revolution has been completed. During this half revolution, the toggle is again broken and frame 141 retracted to the position of Fig. 3.

The shutter 98 is slidably mounted on a crossplate 158 which is carried by studs 159 in brackets 160. Each stud is provided with an adjusting knob 161 by means of which the plate may be raised and lowered for proper adjustment of the response sheet in the machine. The shutter 98 has pin and slot connection 162 (see Fig. 2a) with a lever 163 pivoted upon a bracket 164 which is secured to the plate 146. Also pivoted on bracket 164 is a latch 165 normally urged by a spring 166 in a clockwise direction. At the beginning of of operations, the latch 165 and lever 163 occupy the relative positions shown in Fig. 3. When the plate 146 moves toward the right carrying therewith the bracket 164, lever 163 is caused to turn in a clockwise direction inasmuch as the pin and slot connection 162 remains stationary. Due to this rocking of lever 163, the latch 165 is permitted to rock into the position shown in Figs. 4 and 2a, so that, when the platen is now retracted, the lever 163 held by latch 165 will return, with the parts maintaining the relationship shown in Fig. 2a, whereby the shutter 98 is moved toward the left as viewed in Figs. 4 and 2a, so that the response sheet may drop of its own weight into chute 167 through which it is directed to the hopper 168.

In Figs. 2a, 4 and 21 the rod 103 has a depending arm 169, the free end of which has pin and slot connection 170 with a link 171 whose opposite end is connected to a bell crank 172 which is pivoted to the frame of the machine and which carries a pin 173 underlying a finger of latch 165. When the key 99 is depressed the second time, the pin in the lower end of arm 169 moves toward the right within the slot in link 171 without disturbing the link. When the key is released, however, the link 171 is drawn toward the left rocking the bell crank 172 clockwise as viewed in Fig. 2a to actuate latch 165 for the release of lever 163 whereupon under the influence of spring 174 shutter 98 will return to its intercepting position.

Figure 22:
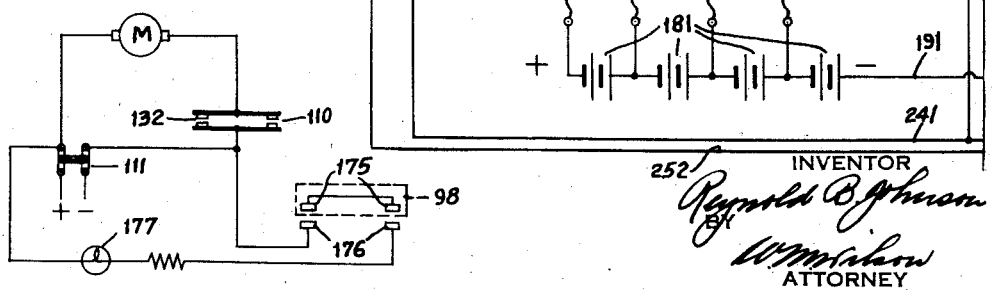
Fig. 22 is a view showing the control circuit for the driving motor.

In the operation of the machine, it is necessary for the operator to hold the key 99 depressed for a short period to enable the response sheet to drop completely into the chute 167 before releasing the key. If it is released sooner, the shutter may strike against the sheet and prevent its further exit. As a precaution, there is mounted on the shutter a pair of contact elements 175 which, when the shutter is closed, contact a pair of contact elements 176 secured to the under side of the sensing unit. These contacts are wired together as shown in Fig. 22, so that, when the pair of contacts 175 on the shutter engages the pair of contacts 176, a circuit is completed through a signal lamp 177, indicating to the operator that the shutter is properly closed and unobstructed. Failure of any sensed response sheet to completely feed out of the sensing position will block one or both of the contacts 175 against engagement with its corresponding contact and the lamp 177 will not be illuminated.

*Control panel*

Figure 2:
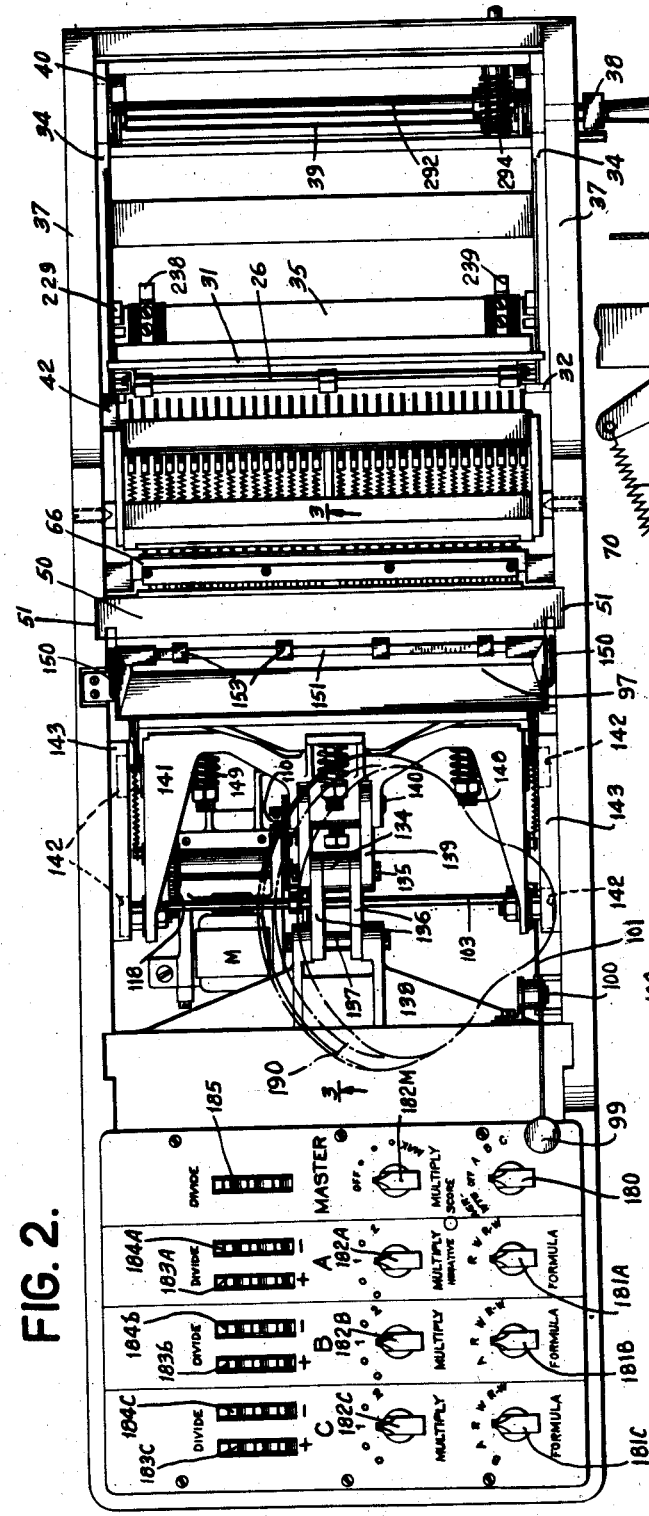
Fig. 2 is a plan view of the machine with the score indicator and part of the casing removed.

The control panel is shown in Fig. 2 at the left end of the machine and is divided into four sections marked A, B, C and Master. The master section is provided with a master control switch 180. Each of the other panels is provided with formula switches designated 181A, 181B, 181C and each of the sections is provided with a so-called multiply switch which is designated 182M, 182A, 182B, 182C. Each of the A, B and C panels are provided with a potentiometer adjusting dial 183A, 183B, 183C and a second similar dial 184A, 184B and 184C, while the master panel is provided with a single dial 185. The switches and potentiometers controlled by the devices shown on the control panel are all diagrammatically represented in the circuit diagram of Fig. 23 and, since these are standard electrical devices, their mechanical construction need not be shown in detail.

The following table shows the proper setting of each of the formula switches and the master control switch to obtain the score of the total number of questions represented on the response sheet or the score of one of the parts or of any combination of the parts. For example, for the first line, if it is desired to score only part A of an examination, the master control switch 180 is set at A, the switch 181A of panel A is set at R, if it is desired to obtain the number of right answers, at W if it is desired to obtain the number of wrong answers or at R—W if it is desired to obtain the number of rights minus the number of wrongs. The switch 181B is set at any position but A, and the switch 181C is set at any position but A or B.

| To score— | Master panel | Set switches at— | | |
| --- | --- | --- | --- | --- |
| | | Panel A | Panel B | Panel C |
| Part A | A | Scoring formula (R, W or R−W). | Any position but "A" | Any position but "A" or "B". |
| Part B | B | Any position | Scoring formula (R, W or R−W) | Do. |
| Part C | C | ___do___ | Any position but "A" | Scoring formula (R, W or R−W). |
| Total, A+B | A | Scoring formula (R, W or R−W). | A | Any position but "A" or "B". |
| Do | A | ___do___ | Any position but "A" | A. |
| Total, A+B+C | A | ___do___ | A | A. |
| Total, B+C | B | R | Scoring formula (R, W or R−W). | B. |

Circuit diagram

In the circuit diagram there is shown a meter 190 which is a direct current milliameter giving a full scale deflection on a current of one milliampere ($\frac{1}{1000}$ of 1 ampere). The meter 190 is provided with a chart calibrated from 0 to 100 on which each division may represent a correct answer, a wrong answer, a difference between right and wrong answer or a percent right or wrong. Each of the resistors 69 shown in Fig. 23a has a resistance of a megohm or more. In the actual machine, a value of 2 megohms is used. There is also provided four batteries 181 such as 45 volt radio B batteries connected together in series. In Fig. 23 the structure of the several switches is shown diagrammatically and the manner in which they are identified will be briefly set forth at this time. Each of the knobs of formula switches 181A, 181B and 181C, is connected to a pair of switch blades F1 and F2 of which the former may contact a series of segments F1a designated R—W, W, R, A and B and the latter may contact a series of similar segments F2a similarly designated. As the three switches are identical in their structure the corresponding parts are given similar reference characters and in tracing the circuits they will be distinguished as for example "the F1 blade of formula switch 181A." The master control switch 180 has six blades designated C1—C6 for engagement with segments identified as C1a—C6a respectively. The multiply switches are labelled M1—M4 and cooperate with segments M1a—M4a respectively.

When a response sheet is inserted in the machine and pressed against the sensing blades 54, 57, a circuit is completed for each pencil mark which is traceable from negative side of battery 181, through line 191 to the wire 59, sensing blade 57, thence through the conductive mark to sensing blade 54 and to the high resistor 69 corresponding to the position in which a mark is present. According to the position of the key set pin 76, the current will follow from the resistor 69 to either the blade structure 92 or the blade structure 93, depending on whether the pin 76 is set in accordance with a wrong or right answer or, as explained hereinabove, if the pin 76 is set at an intermediate position, the circuit will go no further and the mark sensed by the blades 54, 57 will not be taken into account. All of the blade structures 93 in any horizontal row are connected by wires 192 and through a wire 193 are connected to a blade structure 96 associated with the three lower pins 82 of the field identifying pins. All of the blade structures 92 are connected together by a wire 194 and connected by a wire 195 to the blade structure 95 which cooperates with the upper three pins 82 at the end of the column, that is, looking at Fig. 20 the sets of pins 76 are divided into ten separate groups, each having at its outer end a set of six pins 82. All the blade structures 92 of one set are connected to the blade structures cooperating with the upper three pins 82 and all the blade structure 93 of any group are connected to the blade structures cooperating with the three lower pins 82.

In the circuit diagram Fig. 23a only a few of the pins are shown to avoid needless repetition of like parts. In the circuit diagram the two sets of pins 82 shown are those in the upper right hand corner of Fig. 20 and two vertical columns of pins 76 are shown adjacent thereto. All of the ten pins 82 constituting the uppermost pin in each set are electrically connected to one another, all of the next lower pins are connected together and so on. The five pins connected in each of the two vertical columns are connected by means of metallic strips represented at 196 of the circuit diagram. These in turn are wired to the corresponding strips at the opposite side of the key set unit and all of them are connected to six wires generally designated 197. These six wires are designated as A-right, A-wrong, B-right, B-wrong, C-right, C-wrong and connected to the switch blades F1 and F2 as shown in Fig. 23. The pins 82 serve to connect the circuits from the related set of pins 76 to any of the three formula switches through a selected pair of related wires 197.

For example, if the main key sheet is perforated in the position opposite the A-wrong pin 82, this pin will be shifted to make connection with the blade structure 95 so that, if mark is made in the related field in a position representing a wrong response, the circuit from line 191 will go through wire 59, the sensing blades 57, 54, resistor 69, pin 76, which will have been moved toward the left for connection with blade structure 92, thence through wires 194, 195 to blade structure 95, the A-wrong pin 82, the connecting strip 196, the A-wrong wire 197, to the blade F1 of A formula switch 181A. Similarly, if the perforation in the field selection position had been made in line with the B-wrong pin 82, the same circuit would connect the sensing blades through the B-wrong wire 197 to the blade F1 of the B formula switch 181B. In this manner the circuit through any marking position on the response sheet, if it represents a correct answer, will follow first to one of the blade structures 93 and thence according to the setting in the lower three pins 82 and the related section of the key sheet will be directed to any one of the three formula switches. If any marking represents an incorrect answer, the related sensing blade will be connected through the blade structure 92 to any of the three formula switches according to the positioning of the upper three pins 82 of the related set of pins.

Scoring procedure

Let us first follow through with the procedure where there are two answers on the response sheet related to, let us say, test A, and that the main key sheet is perforated in the A-right and A-wrong position in the field selection portion of the sheet related to the field in which the two marks are made, to represent the responses to two questions.

The first step is to obtain a calibration of the meter 190, so that, if both marks represent correct answers, the meter needle will register 2; if only one is correct, it will register 1, and if both are wrong it will remain at 0. To do this a response check sheet is first prepared with both marks made in correct answer designating positions and the key sheet is also perforated in the correct answer positions with the related field selection positions A-right and A-wrong also perforated. The response sheet is then inserted in the machine and the start key 99 depressed to move the platen against the sheet, pressing the latter against the sensing blades 54, 57. A circuit is now traceable from negative side of battery (Fig. 23), wire 191 (Fig. 23a) wire 59, and assuming the marks to be made in the positions opposite the uppermost sets of sensing blades of the two vertical columns shown, parallel circuits will branch through each of these two sets of blades through their resistors 69 and pins 76 to the two blade structures 93, wires 192, 193 to the upper blade structure 96, A-right pin 82, A-right wire 197 (Fig. 23), to switch blade F2. This switch is now set in the dotted line position shown and the circuit will continue through the switch blade F2 to the contact segment F2a labeled "R," thence through wire 200, plus potentiometer wire 201 which has a resistance of 90 ohms, wire 210, contact point C6a, switch C6, in its A position wire 209, contacts 208, wire 207, meter 190, wire 206, contacts 205, wire 204, switch blade C5, wire 203, potentiometer wire 202 which has a resistance of 90 ohms, wire 211, to segment C4a of switch blade C4, wire 212, switch blade M4, the No. 1 segment M4a, wires 213 to plus side of battery. Part of the current also divides at wire 200 going directly through potentiometer wire 201 and wire 211 to plus side of battery as traced. The resulting passage of current through the meter 190 will cause deflection of its indicating needle and the A potentiometers are now adjusted until the needle moves to indicate exactly 2. This is the adjustment for a perfect response sheet. The operating key 99 is now depressed a second time to remove the sheet from the machine and another response sheet is placed in the sensing position and the key again operated to effect sensing of this sheet. If it contains but a single correct mark, the previously traced circuit will pass through one of the resistors 69 and only half as much current will flow through the circuits traced, so that the indicating needle of meter 190 will move only half way to indicate a score of 1. If neither correct answer position has a mark therein, no circuits whatsoever will be completed and the needle remains at 0.

If it is desired to score only the number of wrong answers for a test, the switches F1 and F2 are moved to the position where they contact the segments designated W so that a mark made in a position representing a wrong answer would complete a circuit traceable from line 191, wire 59, blades 54, 57, the related resistor 69, pin 76, metallic section 80, related blade structure 92 with which 80 is in engagement under control of the key sheet, wires 194 and 195 to blade structure 95, thence through A-wrong pin 82, A-wrong wire 197 (Fig. 23) switch blade F1, segment F1a designated W, wire 214, wire 200 from which the current divides, part going through master switch blade C6 to the meter 190 and the remainder to plus side of battery through the master switch blade C4 and multiply switch M4. Through parallel circuits the number of marks representing incorrect answers controls the number of units of current flowing through the circuits, each unit of current effecting the advance by one graduation of the meter indicating needle.

*Weighting the score.*—If it is desired to weight the score, that is, if it is desired to have the meter read more than one unit for each mark closing the pencil mark circuit, more voltage is applied by means of the multiply switch M4 which increases the potential applied to the circuit. Thus, each multiply switch M1 to M4 has four positions in addition to an off position so that, for example, with the switch M4 moved to its "2" position, the circuit path from wire 212 is directed through wire 215 to the plus side of the second battery, thereby increasing the voltage. In the machine disclosed, if the increase is in multiples of two the voltage of the batteries is in the same proportion. It is quite obvious, however, that different ratios of increase may readily be substituted.

*Rights minus wrongs.*—When it is desired to score the number of rights minus the number of wrongs, switches F1 and F2 are moved to contact the segments F1a and F2a designated R—W. With this set-up the flow of current through the mark representing a right answer will be directed through the A-right wire 197 to the switch blade F2 (Fig. 23). From here it will pass to the meter 190 in the same manner as though the blade F2 were set in the R position and the meter needle will be deflected in accordance with the number of units of current flowing through the circuit which in turn will be proportionate to the number of right answers. The current directed to the A-wrong wire 197 under control of the marks representing wrong answers passes through switch F1 and the R—W segment F1a, through a wire 216 to the minus potentiometer 202 and, since this potentiometer winding is connected to the opposite side of the meter through the wire 203, switch blade C5 in the "A" position, wire 204, contacts 205 and wire 206, the current would tend to flow in the opposite direction from the current flowing from the rights circuit, so that the actual current flowing through the meter will be a balance between the current from the rights and the current from the wrongs provided that the arm of potentiometer 202 is adjusted so that each unit of current from the "wrong" circuits depresses the meter one point. Before scoring examination sheets, a "test" sheet with a known number of right and wrong answers is placed in the sensing station and with switches F1, F2 set at "R," potentiometer 201 is adjusted until the meter indicates the known number of right answers. Switches F1 and F2 are then set at R—W and potentiometer 202 is adjusted until the meter indicates the known value of R—W. The initial adjustment of potentiometer 201 is not affected by the subsequent setting of potentiometer 202. It will be observed that with switches F1 and F2 set at R—W, the "rights" circuit extends from wire 200, the lower part of potentiometer 201, wire 210, connections to meter 190 back to wire 203, all of potentiometer 202 and wire 211 to battery 181. The "wrongs" circuit extends from wire 216, the lower part of potentiometer 202, wire 203, circuit connections to meter 190 back to wire 210, all of potentiometer 201 and wire 211 to battery 181. It is thus seen that setting of either potentiometer 201 or 202 does not effect the current controlled by adjustment of the other.

*Negative score.*—Where the number of wrongs exceeds the number of rights, the indicating needle of the meter will, of course, not advance in a clockwise direction but will rock slightly in the opposite direction against the usual limit stop within the casing of the meter. This serves as an indication to the operator that the number of wrongs exceeds the number of rights. If the negative score key 217 is depressed, the connections to the meter 190 will be reversed through the opening of contacts 205, 208, and the closure of contacts 218, 219, which contacts constitute a reversing switch, so that current coming from the "right" answers through wire 209 will go through contacts 218 and through wire 206 to the meter and current coming through wire 204 from the "wrong" answers will go through contacts 219 and wire 207 to the other side of the meter 190. The negative score would thus be directly readable on the meter and in recording the reading the operator will, of course, represent the score as negative.

*Rights minus one-half of the wrongs.*—If it is desired to score in terms of "rights" minus one-half of the "wrongs," formula switch blades F1 and F2 are set to the R—W position and the potentiometer contact arm of the minus potentiometer winding 202 is adjusted to such a position that only half as much current coming from the wrongs circuit 216 tends to flow through the meter as flowed therethrough when the contact arm is adjusted for scoring rights minus wrongs. Similarly, when it is desired to score rights minus one-quarter or any fraction of the wrongs, the minus potentiometer arm is adjusted accordingly, permitting more or less current from the wrongs circuit to pass to the meter.

Briefly recapitulating, the number of answers recorded on the response sheet controls the number of units of current flowing through the meter and by means of the key-set pins 76 the current flow of the "rights" may be separated from the "wrongs" and directed through two separate circuits. With the formula switch set at R, only the "right" circuits are utilized. With the formula switch set at W, only the "wrong" circuits are taken into account, while with the switch at R—W, the difference between the number of "rights" and number of "wrongs" is scored. By suitably adjusting the multiply switch the value of the unit of current for each mark may be increased to several selected values. Also, by adjusting the potentiometers the amount of current flowing through the meter from the "rights" circuit may be made less than the amount of current flowing through the meter from the "wrongs" circuit. This variation is utilized in instances where a "right" answer is given a value of, say, one and a "wrong" answer is given a value of, say, minus 2.

The foregoing circuit description has been concerned with the control of the circuits by a single switch, specifically the formula switch 181A, and the circuits flowing through A-right, A-wrong wires 197 have been specifically traced. The circuits through the formula switch 181B directs the circuits coming through the B-right and B-wrong wires 197 in exactly the same manner as does also the switch 181C for the circuits coming over C-right and C-wrong wires 197, when these two switches are positioned in their R, W, or R—W positions. When the master switch 180 and its blades C1—C6 are set in a "B" position, the circuits through the B formula switch alone will be effective and, when the master switch is set in the C position, only the circuits through the C formula switch will be effective.

*Scoring A+B+C.*—When all the marks on the response sheet are to be scored together, that is, when all the rights or all the wrongs or all the rights minus all the wrongs are to be scored, the various switches are set as indicated in the table given hereinabove along the line designated "Total, A+B+C." With this condition the switches 181B and 181C are moved to their A positions. It will be noted in Fig. 23 that the A positions of these two switches are connected by wires 220 to the switch blade F1 of the A formula switch so that, if the blades 181C and 181B are both set to their A positions, then all the units of current impressed upon all of the wires 197 will flow through the A potentiometers, a portion flowing through the meter 190, and the total number of rights or total number of wrongs or the total of rights minus wrongs will be recorded on the meter accordingly as the switch 181A is set in any of these three related positions.

*Scoring A+B and A+C.*—It is apparent that, if switch 181C is set at any position other than A or B, and the switch 181B is set at A only the A and B circuits will be completed and the C circuits will be interrupted at the switch. Similarly, if the B switch 181B is set at any position other than A, and the switch 181C is set at A, only the A and C circuits will be completed to obtain the result of A+C in accordance with the setting of switch 181A.

*Scoring B+C.*—The B contact segment of blade F1 switch 181C is connected by a wire 222 to the blade F1 of switch 181B and the B segment of blade F2 is connected by a wire 223 to the switch blade F2 of the B switch 181B so that, if switch 181C is set at B and the master control switch is set at B, the B and C circuits will both be directed through the switch C6, set at B, to score according to the setting of the same at R, W or R—W, the circuits being directed through the B potentiometers to the meter 190.

The complete sequence of operations for scoring the response sheet of Fig. 5 will now be reviewed to more clearly explain the various steps involved in the procedure.

The first step is to prepare the main key sheet K. This is done by perforating the index positions corresponding to the right answers, and also punching out the field selecting positions by punching out the A right and wrong positions for test A, the B right and wrong positions for test B and the C right and wrong positions for test C in the manner shown in Fig. 7. As the response sheet of Fig. 5 is to receive written information in the lower right hand corner made by the examinee, the secondary key sheet SK is required as in Fig. 8 with the lower right hand section of the sheet perforated in the positions shown. The key sheets K and SK are then placed in the key sheet holder 22 with the secondary key sheet SK toward the left of the holder and the holder inserted in the grooves of the reciprocable carriage. The handle 38 is then turned through 180° to move the key sheet holder 22 against the pins 76 of the key-set unit, whereby the pins 76 will become adjusted in accordance with the arrangement of perforations on the key sheets, taking various positions as shown in Figs. 10 and 10a.

The next step in preparing the machine for scoring is to adjust and operate the panel controls to the proper positions. Let us assume that the A, B and C tests are to be scored individually. A check sheet is first prepared which is one of the response sheets having all the responses correctly marked. This check sheet is inserted in the machine with the pencil marks facing the sensing blades 54, 57 and the start key 99 is depressed, causing the platen to press the check sheet against the sensing blades. The A formula switch is set at R, the B formula switch at R and the C formula switch at R. The master control switch is set at A and the multiply switches at 1. The A plus potentiometer is then adjusted until the meter needle registers 38, which is the total number of possible responses to test A. The master switch is then turned to its B position and the B potentiometer is adjusted until the needle reads 37, which is the total number of possible responses to test B and then the master switch is turned to the C position and the C potentiometer is adjusted so the meter needle registers 25, which is the total number of possible responses to test C. The meter will thus read the number of answers for each test correctly marked. Then subsequent response sheets would record the actual number of correct responses directly on the meter.

A second check sheet with all the answers incorrectly marked is then inserted in the machine and while this sheet is sensed by the blades 54, 57 and the negative score key is held depressed the minus potentiometers 202 for the three formula switches 181A, 181B, and 181C are adjusted to give readings of 38, 37 and 25 respectively with the formula switches set at R—W. If the scoring is to be R—½W or R¼W the potentiometers are adjusted to read 18½, and 12½ or 9½, 9¼ and 6¼.

The motor bar is now depressed to release the check sheet and the machine is in readiness to score the examinee's response sheet which is now inserted in a machine and the start key operated to urge the platen against the sheet. If test A is to be scored first, the master switch is set at A and with the A formula switch set at R and if the meter has been calibrated as above the number right is directly indicated on meter 190 and recorded on the margin of the response sheet by the operator or on a separate record if desired.

If the A formula switch is now moved to position W, the number of wrong responses is indicated on the meter 190 and recorded, and for the result R—W the formula switch is moved to this position and the result noted on the meter. Where the number of wrongs is greater than the number of rights, the negative score key 217 is operated to reverse the connections to the meter and the negative score directly read from the meter.

With the response sheet still in the machine, the master switch is moved to the B position and the B formula switch moved to its three successive positions in turn and the various scores recorded. In the same manner the master control switch may be moved to the C position and by manipulation of the C formula switch the three different results for the C test are obtained.

When the meter is to indicate the results in terms of percentages the preliminary adjustments are as explained for obtaining the number right or wrong except that when the check sheets are sensed the potentiometer 201 is adjusted so that the meter reads 100 for a perfectly marked sheet.

Where the three tests are to be scored as a single test to obtain R, W and R—W for tests A+B+C a different preliminary calibration is made. In such case, the A formula switch is set first at A and B and C formula switches are set at A. With the check sheet having all answers correctly marked placed in sensing position the A potentiometer 201 is adjusted so the meter 190 indicates 100 the total number of responses for the three tests combined. Similarly with a check sheet having all answers incorrectly marked A potentiometer 202 is adjusted with the negative score key depressed to also read 100 or 50 if the result is to be R—½W. With the preliminary adjustment, scoring of the examinees' response sheets proceeds as before.

After the scores are recorded, the start key is depressed a second time to withdraw the platen from the response sheet which then drops into the discharge hopper and the machine is ready to receive the next response sheet.

The flexibility of the machine permits a greater number of separate tests to be given on a single sheet than the three explained. For example formula switch 181A when in its R position may control the indication of the number of correct responses to a test comprising, say, fifteen questions and when in its W position indicate the number of correct responses to a second test comprising questions 16 to 30. To do this the key sheets K and SK have the right answer positions punched for the first fifteen questions and sheet SK is punched in addition in all wrong answer positions. Thus for these questions, the rights will be scored but the wrongs cannot complete any circuits. For questions 16 to 30 the wrongs are punched in sheet SK and the right positions are left unpunched in both sheets K and SK. The effect of this when the formula switch is set at W is to cause each right answer to complete a circuit through the wrongs wires 197 so the indication will represent the number of right answers in the group of questions 16 to 30. By splitting each of the tests B and C in the same manner, the machine can be made to score the number or percentage of correct answers for six separate tests with a single sensing of the sheet R.

*Aggregate weighting unit*

Figures 11, 11A:
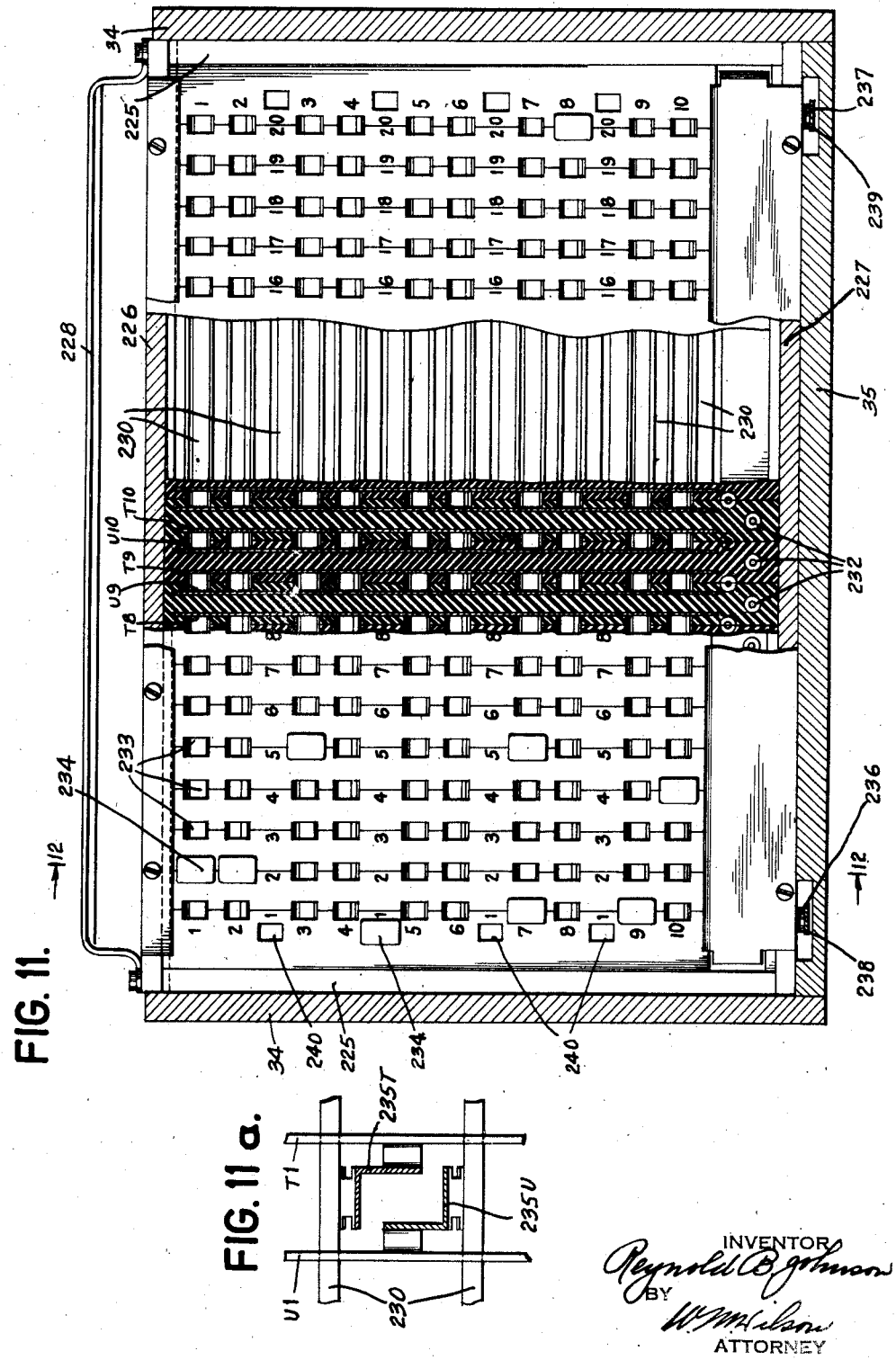
Fig. 11 is a view showing the "aggregate score" plugboard.
Fig. 11a is a detail of cross-section of an "aggregate score" plugboard jack.
Figure 14:
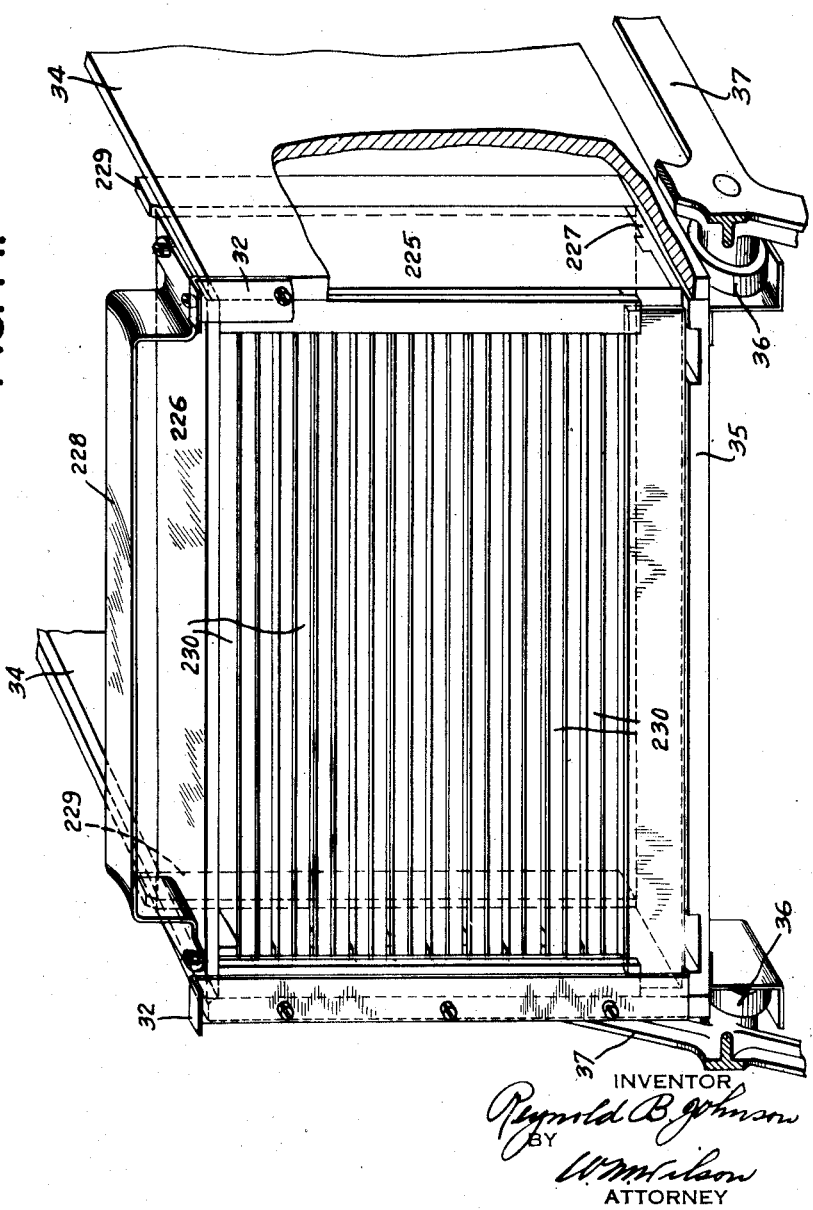
Fig. 14 is an isometric view showing the manner in which the "aggregate score" plugboard is inserted in the machine.

The aggregate weighting unit is shown in Figs. 11 and 14 and comprises a frame formed by side plates 225, top plate 226, bottom plate 227 and is provided with a handle 228. This unit is inserted in the reciprocable carriage between the side plates 34 in place of the key sheet holder shown in Fig. 9, that is, with the key sheet holder 22 and the backing plate 31 removed from the carriage there is a guiding groove for the unit formed between the strips 32 and vertical bars 229, between which the unit is inserted in the position shown in Fig. 14. Mounted in the unit and extending horizontally across one side thereof are a number of metallic angles 230 which, when the unit is inserted in the reciprocable carriage, and the carriage moved forward toward the keyset pins 76, will bring the angles 230 into engagement with the pins as shown in Figs. 12 and 13.

It will be noted in Fig. 12 that certain horizontal rows of pins 76 do not contact with the angles 230. These rows of pins correspond to the portions of the sheet shown in Fig. 6 in which no pencil marks are to be made, that is, the two uppermost rows of pins 76 of Fig. 12 are in line with the two lines of marking positions in sections 1, 11 and 21 of the sheet of Fig. 6. The fourth and fifth columns are in line with the marking positions of fields 2, 12 and 22 while the third column lies between these two fields, and its related sensing pins 76 are not effective. In the effective positions, engagement of the pins 76 with the angles 230 will move the pins to a mid-position where the insulated portion 81 of each of them contacts both blade structures 92 and 93 and there is a direct electrical connection between the sensing blades 54 and 57 through the resistor 69 and the pin 76 to the associated angle 230, and all the pins in one horizontal row make parallel connections to the common angle 230. The field selecting pins 82 at the ends of the key-set unit are in line with a bar 231, Fig. 13, of the unit which engages the pins 82 and moves them to a position where the insulating section 85 thereof engages the blade structure 95 and 96, so that these pins are ineffective for this type of operation.

Opposite the angles and extending vertically across the unit are pairs of metallic strips designated T1, U1, T2, U2, etc., up to T20, U20, there being 20 pairs of such strips which are insulated from one another and from the rest of the unit. The lower end of each of the strips generally designated T and U are wired to resistors 232 arranged in two rows across the bottom of the unit as shown in Fig. 11. In this figure are shown openings 233 into which plugs or jacks 234 may be inserted. Each jack carries two double-blade metallic portions 235T and 235U (Fig. 11a) which, when inserted in any opening 233, will make electrical connection between a pair of angles 230 and a pair of vertical strips U and T. The unit is in effect a grid structure as diagrammatically represented in Fig. 23b with the member 235T serving to make electrical connection between an angle 230 and a vertical strip T and the member 235U making connection between the lower adjacent angle 230 and a vertical strip U. At the bottom of the sheet are shown the two rows of resistances 232 connected in series with one end of the series connected to a contact 236 and the other end connected to a contact 237. These contacts are shown in Figs. 11 and 12 and, when the unit is inserted in the reciprocable carriage, they make contact with blades 238 and 239 respectively, which are carried by the plate 35 of the carriage and are wired as shown in the circuit diagram. A jack 234 is provided for each horizontal row of openings 233 (Fig. 11) and when any row is not used, its plug may be inserted in an inactive opening 240.

The function of the aggregate score unit is to multiply the numerical values recorded on the aggregate score form of Fig. 6 by some whole number from 1 to 20. As shown in Fig. 11, each jack 234 for any row may be inserted in one of the openings 233 of that row in any of the 20 positions. If the jack for the top row is inserted in the first hole to the left, the score or other numerical value recorded in the top score areas 1, 11 and 21 of Fig. 6 will be weighted "1." If the plug is inserted in the hole to the extreme right, the weight applied to this number will be "20." If the jack is inserted in any hole between these extremes, some other weight from 2 to 19 will be applied. Each plug can be inserted in any of the 20 holes, that is, any of 20 weights can be applied to any score recorded on the marked form.

The operation of the device may be best understood by following through a specific example with the aid of the circuit diagram. With the aggregate score unit placed in the reciprocable carriage, and the same advanced against the key set pins 76, the score sheet of Fig. 6 is inserted in the machine with the pencil marks facing the sensing blades 54, 57. Upon operation of the starting key 99 as already explained, the sheet is forced against the sensing blades 54, 57. In Fig. 13 there is shown a sheet W with a pencil mark thereon which extends across six sets of sensing blades 54, 57 so that inasmuch as the blades 57 are connected to one side of the battery (see Fig. 23a), current will flow through the six related resistors 69 and through the related key-set pins 76 to the common angle 230. In other words, six units of current will be transmitted through the long pencil mark to the angle. Thus, if a section of the score sheet is marked to represent a measure 66 as in the lower upper right section 1 of the sheet in Fig. 6, the two pencil marks in this field would each permit six units of current to flow to the two uppermost angles 230 of Fig. 23b. Let us assume that for this measure the jack 234 is inserted in the weighting position "1" so that contact blade 235T connects the uppermost angle 230 with the bar T1 and the contact 235U connects the second horizontal bar 230 with the vertical bar U1 as diagrammatically shown in Fig. 23b. Current will then flow over the units positions from the second angle 230 (Fig. 23b), contact 235U, vertical strip U1, through resistor 232 designated 1, contacts 236, 238, wire 241 (Figs. 23a and 23), 250 to contact segment "Agg. Wt." of the master control switch, blade C1, wire 247, switch M1, to positive side of battery. A parallel circuit follows from strip U1 (Fig. 23b) the remainder of the resistors 232, wire 251, contacts 237, 239, wire 252 (Figs. 23a and 23), switch blade C6, wire 209, contacts 208, wire 207, meter 190, wire 206, contacts 205, wire 204, switch blade C5, wire 246, switch C1, wire 247, switch M1 to battery.

A shunt circuit across the meter wires 204, 209 includes the potentiometer 244, which is connected through wire 245 and switch C5 to wire 204 and through wire 243 and switch C6 to wire 209 so that only part of the current will pass through the meter. It should be pointed out that switch blades C1—C6 are set in their dotted line position shown in Fig. 23 for this type of operation.

In this manner the number of units of current transmitted through the pencil mark to the aggregate unit is transmitted to the meter.

In Fig. 23b the resistances 232 designated 21 to 38 have a value ten times greater than the first set, and if the jack 234 had been placed in the next hole designated 2 so that the six units of current flow through the angle 2 to the bar U2, two of the resistances 232 designated 1 and 2 would be cut out of the meter circuit 251 and twice as much current would be permitted to flow through the meter. Likewise, if the jack were inserted in the last position designated 20, the entire first 20 resistances will be shunted out of the meter circuit permitting 20 times as much current to pass through the meter. In practice, the resistances numbered 1 to 20 inclusive have a value of 2.5 ohms and the resistances 21 to 38 inclusive have a value of 25 ohms which gives a total of 500 ohms with all of them in series.

The vertical strips designated T are so connected to the resistors 232 that 10 times the amount of current flows through the circuit as for the corresponding units strip. Thus, where a pair of lines representing a measure of 66 are sensed, the units line will cause six units of current to pass through the meter and the tens line will cause 60 units of current to pass through the meter. In the same manner each of the other lines in the separate fields of the sheet will impress a number of units of current on the related angles 230, so that the total of all the units will be recorded on the meter in accordance with the setting of the weighting jack 234 for each of the measures.

Before any of the sheets of Fig. 6 are placed in the machine and sensed, it is necessary to calibrate the meter by first preparing a check sheet in which a pencil line is drawn through all the upper or tens lines W2 (Fig. 6) in each field to be weighted, that is, each field to be weighted is marked to represent 100, and the jacks 234 are inserted in accordance with the weight to be given the different measures. The check sheet is then dropped into sensing position and start key operated to sense this sheet. The master control switch is set in the "Agg. Wt." position and the potentiometer 244 is adjusted until the meter registers 100. In conjunction with the setting of the potentiometer the multiply switch M1 is also manipulated to bring the setting of the meter needle within the range of the potentiometer. With the switch and potentiometer so adjusted that the meter reads 100, the machine is ready to obtain the weighted averages of the sheets containing the various measures. The reading obtained from each sheet will depend upon the values recorded thereon and the weighting given these values. This reading will be in direct proportion to the values arrived at by multiplying the values to be aggregated by the weights that are applied and adding these products.

Item weighting unit

The machine is provided with a further unit called the "item weighting unit" which is used for scoring responses where each individual response position is to be given a different weight. The function of the item weighting unit is to direct the current coming from the individual sensing circuits in varying proportions so that the current going through the meter from any given circuit will be any desired one of ten possible fractions of a value. The unit is shown in Figs. 24, 25 and 26 and comprises a box-like frame 275 which is insertable in the reciprocable carriage between the side plates 34 as shown in Fig. 24. The unit is provided with a slot 276 which serves to cooperate with guide bars 229 to maintain the unit in position on the sliding carriage. Within the unit are a number of contact elements 278 which are insulated from one another and of which there is one provided for each possible marking position on the record to be sensed. Lying adjacent to each vertical column of elements 278 is a series of ten conducting strips 279 which are common to all the elements 278 in the same vertical column. For each element 278 there is provided a sliding contact 280 which serves to electrically connect the element 278 with any one of the conducting strips 279. The contact 280 is supported in an insulating block 281 which is carried by a pin 282 normally biased toward the right as viewed in Fig. 25 by a spring 283. The pin 282 has a number of shoulders 284 through the medium of which the contact 280 may be variously positioned as will be presently explained.

Carried by the reciprocable carriage and forming an integral part thereof is a frame comprising a front plate 285 and a back plate 286 which are secured to side posts 287. Each post is mounted for horizontal reciprocation in guide slots 288 of the side plate 34 and is connected by links 289 (Fig. 26) to a pair of arms 290 which are connected together by a link 291 for parallel movement. The upper arm 290 is secured to a rod 292 upon which is also secured a worm wheel sector 293 which meshes with a worm 294 suitably supported in the side plate 34. On the shaft 295 of the worm there is mounted a handle 296 which, when rotated, will cause rocking of sector 293 and movement of the frame plates 285, 286 toward the left as viewed in Fig. 26.

Between the plates 285, 286 there is inserted the key plate KP shown in Fig. 24. This plate may be made of record material but for cases where it is to be repeatedly used, a thin metallic plate is preferable. A number of positions are provided one for each of the pins 282 and in each position holes 300 may be made which vary in size according to the weight to be given to the mark in the corresponding position. For present purposes ten different hole sizes are employed. After the key plate KP has been prepared in accordance with the desired weighting, the plate is inserted in position between the plates 285, 286 as shown in Figs. 25 and 26 with the bottom of the plate resting upon locating pins 301. When this has been done, the handle 296 is rotated, forcing the key plate against the ends of the shouldered pins 282 and in accordance with the size of each hole its corresponding pin will be moved a greater or less distance toward the left to cooperate with and connect a selected one of the conducting strips 279 with the related contact segment 278.

With the pins 282 thus differentially displaced, the entire reciprocable carriage is moved toward the left in the now familiar manner in response to the rotating of the shaft 39 by crank handle 38. The contact segments 278 will thereupon each engage their corresponding key pins 76 moving them to their intermediate positions in which they make no electrical connection with the blade structures 92 or 93 so that any current flowing from a mark in line with a particular key pin will pass directly to the contact segment 278 in the corresponding position. The field selection pins 82 are also engaged by the end of the unit and moved to an ineffective position, although it may be observed from Fig. 23a that with all the pins 76 in their "off" position no current will flow to the field selecting pins and that they may, therefore, occupy any position.

The item weighting unit is provided with a pair of contacts 303 and 304 whose location is indicated in Fig. 25. These contacts, when the unit is inserted in the machine engage contacts 238 and 239 which are carried by the reciprocable carriage. Referring now to Fig. 27, there is shown in diagrammatic form the circuit connections involved in the item weighting unit. The circuit diagram of the machine, when this unit is used, is represented by Figs. 23, 23a and 27 placed side by side in the order named. In Fig. 27 there are shown two vertical columns of contact segments 278, each with five segments indicated to correspond to the same number of key pins 76 shown in Fig. 23a. The sliding contacts 280 are represented by arrows and are variously positioned. Each vertical strip 279 is electrically connected as by a wire 305 to each of the corresponding strips in all the other vertical columns of the unit, and the strips, each of which has a resistances 306 as shown. Thus, if a mark is sensed on a record sheet in, say for example, the uppermost position of the right hand column of Fig. 27, current will flow from battery through the corresponding key pin 76 to the uppermost segment 278 thence through contact slide 280 to the connected conducting strip 279 and from there through one of the wires 307 to the resistors 306 through which part of the current will flow through wire 308, contacts 303, 238 to wire 241 and thence to the other side of battery through the now familiar path. A part of the current will also flow in the other direction through wire

209, contacts 204, 239 to wire 252 and thence to the meter 190. In each case the amount of current flowing through any pencil mark is determined by the setting of the related contact slide 280. The resistors 306 are arranged in series so that the amount of current varies from one to ten units. Thus, with the contact slide 280 positioned to connect a segment 278 with the right hand or number ten strip 279, ten times as much current will flow through the meter than when the slide is positioned against the left hand or number one conducting strip 279.

For this operation the master control switch is set at the "aggregate weight position" and a preliminary adjustment of the potentiometer 244 is made to effect the initial calibration. The provision of this unit considerably extends the range of usefulness of the machine which is not limited to the scoring of examination papers but may be applied to the solution of many other problems of which a representative one will be briefly mentioned.

*Profile analysis.*—The machine may be employed to compare a selected combination of variables with other combinations of the same variables to determine their relationship to one another. Thus, for example, as represented in Figs. 28, 29, and 30, a record such as Fig. 28 may have columns of perforations in which the number of perforations in each column represents a different variable. In a particular instance relating to weather forecasting, the perforations in one column may represent the percentage of precipitation on a particular day, another column may represent the temperature, another one the humidity and so on. This sheet is to be compared with other sheets which had previously been prepared to record the same conditions for other days.

The first step would be to calibrate the meter which is done by first preparing a marked sheet with a mark for each position punched on the perforated sheet of Fig. 28. The perforated sheet is then placed in the key holder and the correspondingly marked sheet in the sensing unit. With the formula switches set at R—W and the field selecting positions punched at the A-right and wrong positions, the formula potentiometers are adjusted so that the meter reads 100 or any desired figure. For instance, for the sheet having the profile of Fig. 28, the meter might be adjusted to read "23" which is the number of positions punched out. With such calibration, if the sheet of Fig. 29 is inserted in the sensing position, the meter will read "14". This result follows in accordance with the manner of operation explained hereinabove, that is, for each position marked in Fig. 29 which corresponds to a position punched in Fig. 28, the meter receives a unit of current and the indicating needle advances one point. For each position marked in Fig. 29 which does not have a corresponding hole in Fig. 28, the needle is moved one point in the opposite direction. Inspection will show that there are 17 positions in Fig. 29 that have corresponding holes in Fig. 28 and there are three positions for which no holes are present in Fig. 28, resulting in a total movement of 14 on the meter. In Fig. 30 is shown a further sheet in which the measures have different values. On this sheet there are twenty-three positions that have corresponding holes in Fig. 28 and there are five positions marked that do not have corresponding holes in Fig. 28 with the result that the meter needle moves to a position indicating 18 and thus representing a profile more nearly like the master profile in Fig. 28 than the profile of Fig. 29.

While there has been shown and described and pointed out the fundamental novel features of the invention as applied to a single modification it will be understood that various omissions and substitutions and changes in the form and details of the device illustrated and in its operation may be made by those skilled in the art without departing from the spirit of the invention. It is the intention, therefore, to be limited only as indicated by the scope of the following claims.

What is claimed is:

1. In a machine for evaluating marks on a sheet having a pair of sets of mark receiving areas, each set having its areas distributed along the length and width of the sheet, said machine having electrical sensing devices arranged similarly to said areas, one such device for each area, for electrically sensing both of said sets of areas simultaneously for marks, an ammeter, a source of current, a plurality of circuit connections of like ohmic value, one for each sensing device, said sensing devices, each upon sensing a mark, causing its circuit connection to be connected to one side of said source, in combination with a first resistor connecting one side of the ammeter to the other side of said source, a second resistor connecting the other side of the ammeter to said other side of said source, means for connecting the circuit connections related to one set of areas in parallel to an intermediate point of said first resistor, means for connecting the circuit connections related to the other set of areas in parallel to an intermediate point of said second resistor whereby the current flowing through the ammeter will be proportionate to the difference between the numbers of marks sensed in the two areas.

2. The invention set forth in claim 1 in which a manually adjustable switching device is provided in the last two named connecting means, a further connection, said switching device having three positions so that when set in one position the ammeter will be controlled in accordance with said difference, when set in a second position only marks in the areas of one set will control the ammeter through said first resistor, said switch breaking the connections to the second set, and when set in a third position connecting the circuit connections related to the marks of the other set to control the ammeter through said further connection and the said first resistor as for the first set, said switch breaking the connections to the first set.

3. In a test scoring machine for operating on a sheet having a plurality of marking fields, each field having a plurality of marking spaces, means for simultaneously sensing all the marking spaces in all the marking fields, a current responsive indicating device, a source of current, a plurality of circuit connections, one for each field, each being controllable by the related part of the sensing means to connect the indicating device to the source of current, each connection having an ohmic value proportionate to the number of marks sensed in the related field, a settable switching device included in each of said connections, further normally incomplete connections between said first named connections, said switching devices when in one alternative setting completing one of the circuit connections between said source and device, when in another alternative setting completing more than one circuit connection in parallel through part of said further connections and when in a still further alternative setting completing all the circuit connections in parallel through said further connections, whereby the indicating device may be connected to the source through one or more than one circuit connection in parallel to be controlled in accordance with the ohmic values so connected.

4. In a test scoring machine, a source of current, an ammeter, a pair of potentiometers connected in parallel to one side of said source and to opposite sides of said ammeter, a pair of controlling connections extending from said potentiometers, a resistor, mark sensing means for sensing a designation on a record, and for connecting said resistor to the other side of said source, and a settable device selectively settable to connect said resistor to either of said controlling connections whereby potential is applied through the resistor to either side of the ammeter according to the setting of said device.

5. In a test scoring machine, a source of current, an ammeter, a pair of potentiometers connected in parallel to the one side of said source and to opposite sides of said ammeter, a pair of controlling connections extending from said potentiometers, a plurality of resistors, mark sensing means for concurrently sensing a plurality of designations on a record, said sensing means, upon sensing designations, connecting a number of said resistors equal to the number of designations sensed, in parallel to the other side of said source, a plurality of settable devices, one for each resistor, each device selectively connecting its related resistor to either of said controlling connections whereby variable numbers of resistors will be connected in parallel to opposite sides of said ammeter and the current flowing through the ammeter will be determined by the relative number of resistors connected to the opposite sides of the ammeter.

6. In a machine for scoring examination sheets having conductive marks selectively placed thereon and according to the position placed, representing answers to questions, a sensing station comprising a set of stationary pins, one for each marking position of the examination sheet, a plurality of movable pins, one for each stationary pin, each stationary pin having constant electrical connection with its related movable pin, means for presenting said examination sheet to said stationary pins whereby each position will be adjacent to a corresponding pin, means for presenting a key sheet having perforations arranged to correspond in location to the designations of a correctly answered examination sheet, to said movable pins, means for pressing the key sheet against the movable pins to adjust the same according to the presence or absence of holes, a right answer circuit connection, a wrong answer circuit connection, said key sheet causing each movable pin by virtue of its adjustment to electrically connect with either of said circuit connections, a source of current, one side thereof being connected through said conductive marks, to the related stationary pins, a control circuit connection including a current responsive device connected to the other side of said source, a switch for each of said right and wrong answer connections and further connections therebetween whereby through positioning of said switch either or both said answer connections may be connected to said control connection.

7. In a machine for scoring examination sheets having designations selectively placed thereon and according to the position placed representing answers to questions, means for concurrently sensing all designation receiving positions for designations thereon, an indicating meter responsive to magnitude of current passing therethrough, a source of current, a plurality of like valued resistors, means for presenting a key sheet having designations therein arranged to correspond to the designations of a correctly answered examination sheet, to said sensing means, means jointly controlled by said sensing means and said key sheet for connecting a number of said resistors equal in number to correct answer designations in parallel to direct current from source to one side of said meter, and further means jointly controlled by said sensing means and said key sheet for connecting a number of said resistors equal in number to incorrect answer designations in parallel to direct current from said source to the other side of said meter, both said last named means acting concurrently, whereby the potential applied to opposite sides of the meter will be in accordance with the number of correct and incorrect answers on the examination sheet and said meter will indicate the difference therebetween.

8. The invention set forth in claim 5 in which each settable device is arranged for selectively connecting its related resistor to either or neither of said controlling connections.

9. The invention set forth in claim 5 in which each settable device is arranged for selectively connecting its related resistor to either or neither of said controlling connections and in which means is provided to concurrently set all of said settable devices, each to effect one of its three possible settings.

10. In an examination test scoring machine having a fixed frame, and a plurality of settable pins slidably mounted in said frame; the combination therewith of means for concurrently setting said pins in different positions comprising a carriage, a record holder insertible in said carriage, said holder being arranged to receive a pair of perforated records and retain them in spaced superposed relationship, each record having a perforation receiving position in line with a similar position in the other record and in line with each of said pins, there being for each position either a hole in only the record nearer the pin, a hole in both records, or no hole in the nearer record, means for moving said carriage and inserted holder toward said pins whereby said records will engage and displace said pins various distances according to the arrangement of perforations therein, a pair of circuit connections for each pin, one normally open and the other normally closed, and means controlled by each pin for opening the normally closed circuit connection when in the related position there is a hole in only the record nearer the pin, and for closing the normally open circuit connection and opening the normally closed circuit connection when there is no hole in the nearer record, said circuit connections remaining in their normal condition when there is a hole in both records.

11. In a test scoring machine having a sensing element engageable with a conductive mark made on an examination sheet through which mark current is passed to the sensing element, the combination of a pair of circuit connections selectively electrically connectable to said sensing element and means for effecting said selective connection comprising a pair of fixed spaced terminals for said connections, a movable element having constant electrical connection with said sensing element, said element having three positions in which it electrically connects the sensing element to one or the other or neither of said terminals, the movable element normally occupying a position connecting one of the terminals, and a presettable device for moving said movable element to either of its other two positions.

12. In a machine for scoring examination sheets having a plurality of marking positions, marks therein indicating an examinee's choice of answers, the combination of a plurality of sensing devices, one for each marking position, means for causing said sensing devices to concurrently sense all the marking positions on a sheet, a current responsive indicating meter having a pointer, a plurality of circuit connections of like ohmic value, one for each sensing device, presettable means for associating in one group the sensing devices and related circuit connections of all marking positions corresponding to correct answers and for associating in a second group the sensing devices and related circuit connections of all marking positions corresponding to incorrect answers, means controlled by the marks of one group through the related sensing devices and circuit connections for causing the current from said source to the meter to tend to deflect the pointer to indicate the number of correct answers by deflection a distance proportional to the number of correct answers, said settable means causing the current to flow in one direction, further means controlled by the marks of the other group through the related sensing devices and circuit connections for causing the current from said source to the meter to tend to deflect the pointer to indicate the number of incorrect answers by deflection a distance proportional to the number of incorrect answers, said settable means causing the current to flow in the opposite direction, both said means controlled by the marks acting simultaneously whereby the pointer will indicate the difference between the number of correct and incorrect answers.

REYNOLD B. JOHNSON.

CERTIFICATE OF CORRECTION.

Patent No. 2,275,590. March 10, 1942.

REYNOLD B. JOHNSON.

It is hereby certified that error appears in the printed specification of the above numbered patent requiring correction as follows: Page 7, in the table, first column thereof, for "Do" read --Total, A+·C--; and that the said Letters Patent should be read with this correction therein that the same may conform to the record of the case in the Patent Office.

Signed and sealed this 9th day of June, A. D. 1942.

(Seal)

Henry Van Arsdale,
Acting Commissioner of Patents.